United States Patent
Condreay et al.

(10) Patent No.: US 9,001,992 B1
(45) Date of Patent: *Apr. 7, 2015

(54) SYSTEM AND METHOD TO CONNECT A CALL

(71) Applicant: United Services Automobile Association (USAA), San Antonio, TX (US)

(72) Inventors: V. Adele Condreay, San Antonio, TX (US); Jason New, San Antonio, TX (US); Bill Grigsby, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,227

(22) Filed: Aug. 22, 2013

Related U.S. Application Data

(63) Continuation of application No. 11/835,919, filed on Aug. 8, 2007, now Pat. No. 8,520,832.

(60) Provisional application No. 60/946,265, filed on Jun. 26, 2007.

(51) Int. Cl.
  *H04M 3/00* (2006.01)
  *H04M 5/00* (2006.01)
  *H04M 3/523* (2006.01)

(52) U.S. Cl.
  CPC .................................. *H04M 3/5235* (2013.01)

(58) Field of Classification Search
  USPC .................. 379/223, 218.01, 265.01, 265.12, 379/265.13, 266.01
  See application file for complete search history.

(56) References Cited

U.S. PATENT DOCUMENTS

| | | | |
|---|---|---|---|
| 5,757,904 A | 5/1998 | Anderson | |
| 6,049,602 A | 4/2000 | Foladare et al. | |
| 6,049,603 A * | 4/2000 | Schwartz et al. | 379/309 |
| 6,243,684 B1 * | 6/2001 | Stuart et al. | 704/275 |
| 6,295,551 B1 | 9/2001 | Roberts et al. | |
| 6,408,066 B1 * | 6/2002 | Andruska et al. | 379/265.12 |
| 6,411,805 B1 | 6/2002 | Becker et al. | |
| 6,697,858 B1 | 2/2004 | Ezerzer et al. | |
| 6,925,165 B2 | 8/2005 | Cohen et al. | |
| 6,975,720 B1 | 12/2005 | Crook | |
| 7,366,293 B2 * | 4/2008 | Ezerzer et al. | 379/265.1 |
| 7,536,002 B1 | 5/2009 | Ma et al. | |
| 8,520,832 B1 * | 8/2013 | Condreay et al. | 379/265.12 |
| 2005/0129214 A1 | 6/2005 | Tygarajan et al. | |

* cited by examiner

*Primary Examiner* — Antim Shah

(74) *Attorney, Agent, or Firm* — Eric L. Sophir; Dentons US LLP

(57) ABSTRACT

Disclosed are systems and methods to connect a call. The systems and methods provide techniques to receive a call from a caller and determine a calf path for the call. The call path is used to connect the caller to a call path destination. The call path destination may vary depending on factors in addition to the call path, such as, for example, a classification of the caller and a classification of the representative to whom the caller is to be connected.

13 Claims, 29 Drawing Sheets

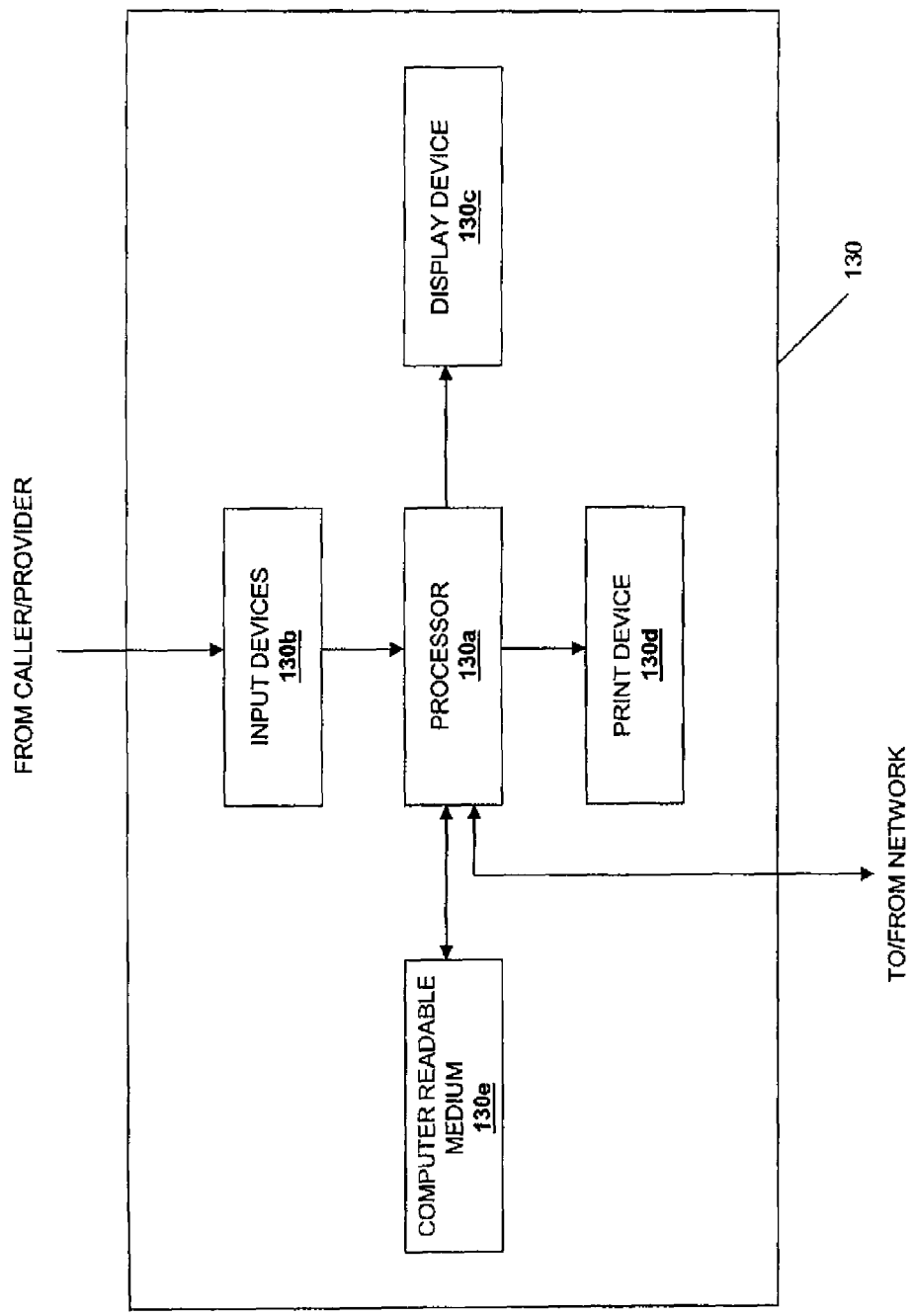

SYSTEM AND METHOD TO CONNECT A CALL

CROSS REFERENCE TO RELATED APPLICATIONS

The present application claims priority to U.S. patent application Ser. No. 11/835,919, filed Aug. 8, 2007, now U.S. Pat. No. 8,520,832, which claims priority to U.S. Provisional Application Ser. No. 60/946,265, filed Jun. 26, 2007. The present application is related to: (1) U.S. Utility application Ser. No. 11/835,933, filed on Aug. 8, 2007, and (2) U.S. Utility application Ser. No. 11/835,946, filed on Aug. 8, 2007, the disclosures of which are incorporated herein by reference.

FIELD OF THE DISCLOSURE

Various embodiments of this disclosure pertain to a system and method to connect a calf, for example, from a caller to a provider, in order to quickly and efficiently connect the caller to a proper representative of the provider.

BACKGROUND

Connecting a call is well-known and readily appreciated by those of skill in the art. Typically, a caller will call a provider to speak to a representative of the provider. Some providers may, for example, be involved in multiple business areas that may be very different from each other, and the caller may need to speak to a specific representative of one of those business areas. Conventionally, the caller will first be connected to an initial representative who then attempts to determine the proper representative of the provider to whom the caller needs to be transferred. The connecting of the caller from the initial representative to the proper representative raises a number of issues.

Conventionally, the initial representative has access to multiple phone number repositories that house representatives' phone numbers across the different business lines of the provider. These repositories are generally not organized well, and are typically either not updated or are updated very slowly in response to changes in the representatives' numbers. The initial representative typically must choose their 'best guess' of a number from one of the repositories that may connect the caller to a representative who might help them. This can result in a high number of misdirected calls, with callers connected to representatives in the wrong business areas. Also, some of these repositories may include only high-level numbers for a given business area, which can result in multiple transfers to connect a caller to the proper representative. Such conventional systems use resources to connect calls while providing a bad caller experience that takes up a significant amount of both the provider's and the caller's time, with little consistency regarding the representatives that two similarly situated callers may be connected to for a similar call.

Accordingly, it is desirable to provide an improved system and method to connect a call.

SUMMARY

Various embodiments of the present disclosure are directed to systems and methods to connect a call. The systems and methods provide techniques to receive a call from a caller and determine a call path for the call. The call path is used to connect the caller to a call path destination. The call path destination may vary depending on factors that are associated with the call path, such as, for example, a classification of the caller and a classification of the representative to whom the caller is to be connected.

BRIEF DESCRIPTION OF THE DRAWINGS

FIG. 1b is a schematic view illustrating an embodiment of an information handling system used with the system to connect a call of FIG. 1a.

FIG. 1c is a schematic view illustrating an embodiment of a provider used in the system to connect a call of FIG. 1a.

FIG. 2b is a screenshot illustrating an embodiment of a metrics webpage used in the method of FIG. 2a.

FIG. 2c is a screenshot illustrating an embodiment of a directory webpage used in the method of FIG. 2a.

FIG. 2d is a screenshot illustrating an embodiment of a first product search webpage used in the method of FIG. 2a.

FIG. 2e is a screenshot illustrating an embodiment of a second product search webpage used in the method of FIG. 2a.

FIG. 2f is a screenshot illustrating an embodiment of a call path options webpage, without a call path destination, used in the method of FIG. 2a.

FIG. 2g is a screenshot illustrating an embodiment of a call path options webpage, with a call path destination, used in the method of FIG. 2a.

FIG. 2h is a screenshot illustrating an embodiment of a call path options webpage, with an unavailable call path destination, used in the method of FIG. 2a.

DETAILED DESCRIPTION

Figure 1A:
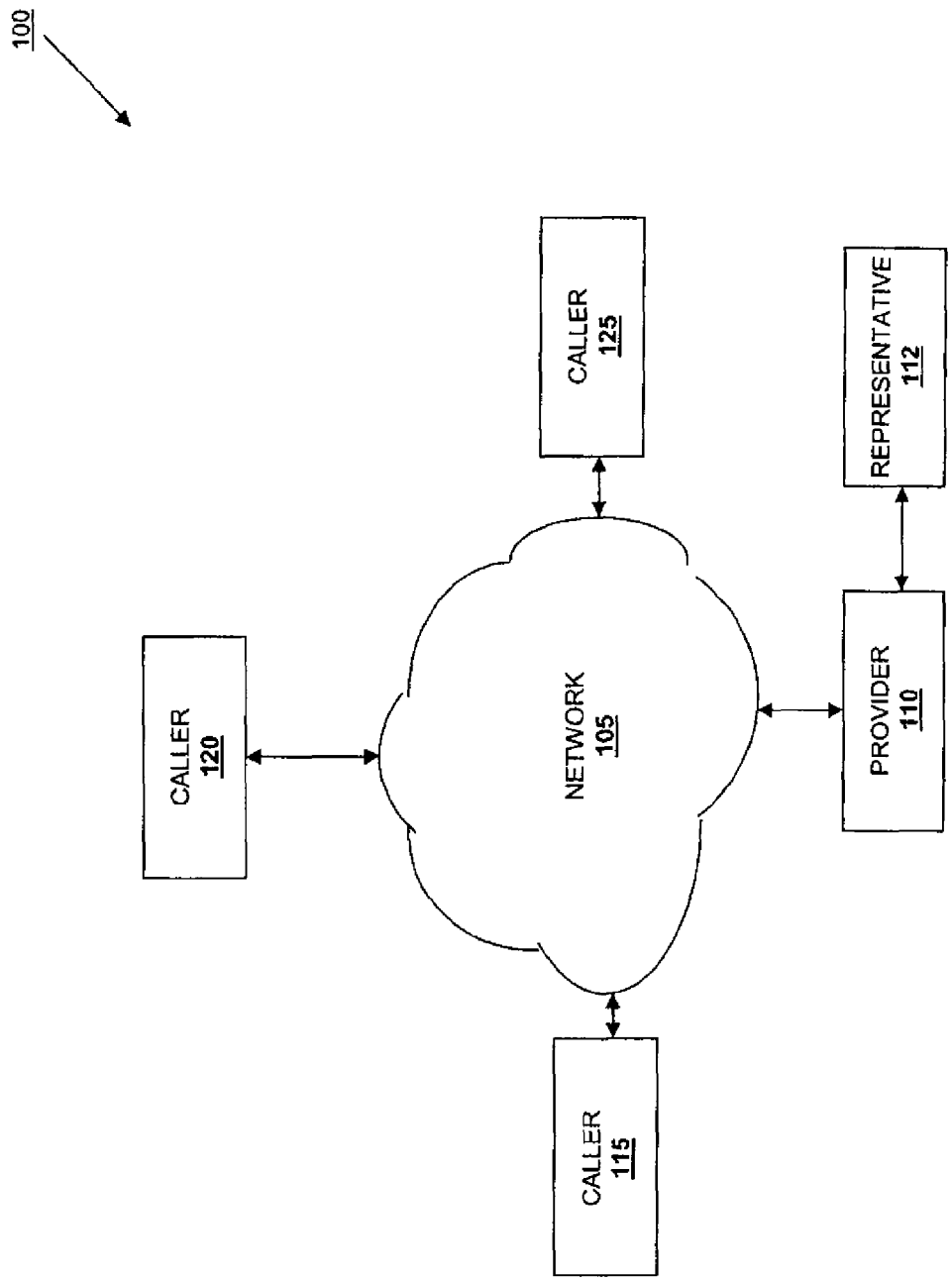
FIG. 1a is a schematic view illustrating an embodiment of a system to connect a call.

Referring now to FIG. 1a, in one embodiment, a system 100 to connect a call is illustrated. The system 100 includes a network 105 such as, for example, a Transport Control Protocol/Internet Protocol (TCP/IP) network (e.g., the Internet or an intranet). A provider 110 is operably coupled to the network 105 and includes at least one representative 112. A plurality of callers 115, 120 and 125 are also operably coupled to the network 105 in order to allow communication between the callers 115, 120 and 125 and the provider 110. In an embodiment, the provider 110 includes a membership organization which provides a plurality of business services to serve its members, such as, for example, banking, insurance, financial services, loans, and/or a variety of other services known in the art, wherein the members include callers 115, 120 and 125. In an embodiment, the provider 110 includes anyone connecting a call. In an embodiment, the provider 110 is a third party with respect to a caller and an entity that the caller wishes to contact. In an embodiment, the callers 115, 120 and 125 may be, for example, previous customers of the provider 110, future customers of the provider 110, employees of the provider 110, and/or a variety of other callers known in the art. In an embodiment, the provider 110 is connected to a plurality of third party providers through the network 105, where the third party providers provide a plurality of goods and/or services known in the art.

Each of the provider 110 and the callers 115, 120 and 125 includes a respective network interface for communicating with the network 105 (e.g., outputting information to, and receiving information from, the network 105), such as by transferring information (e.g., instructions, data, signals) between such callers and the network 105. Accordingly, through the network 105, the provider 110 communicates with the callers 115, 120 and 125, and the callers 115, 120 and 125 communicate with the provider 110.

For clarity, FIG. 1a depicts only one provider 110. However, the system 100 may include a plurality of providers or a plurality of third party providers connected to the provider 110. Likewise, for clarity, FIG. 1a depicts only three callers 115, 120 and 125. However, the system 100 may include a plurality of callers. In the discussion below, the caller 115 is a representative one of the callers 115, 120 and 125.

Each of the provider 110 and the callers 115, 120 and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other through the network 105. Accordingly, the provider 110 and the callers 115, 120 and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tube (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer-readable medium 130e, which is operably coupled to the processor 130a, for storing information, as discussed further below, and (f) various other electronic circuitry for performing other operations of the IHS 130 known in the art.

For example, the IHS 130 may include (a) a network interface (e.g., circuitry) for communicating between the processor 130a and the network 105 and (b) a memory device (e.g., a random access memory (RAM) device or a read-only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer-readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices 130b include a variety of input devices known in the art such as, for example, a conventional electronic keyboard and a pointing device such as, for example, a conventional electronic mouse, trackball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor-control information from the pointing device.

The computer-readable medium 130e and the processor 130a are structurally and functionally interrelated with one another as described below in further detail. Each IHS of the illustrative embodiment is structurally and functionally interrelated with a respective computer-readable medium, similar to the manner in which the processor 130a is structurally and functionally interrelated with the computer-readable medium 130e. In that regard, the computer-readable medium 130e is a representative one of such computer-readable media including, for example, but not limited to, a hard disk drive.

The computer-readable medium 130e stores (e.g., encodes, records, or embodies) functional descriptive material (e.g., including but not limited to software (also referred to as computer programs or applications) or data structures). Such functional descriptive material imparts functionality when encoded on the computer-readable medium 130e. Also, such functional descriptive material is structurally and functionally interrelated to the computer-readable medium 130e.

With such functional descriptive material, data structures define structural and functional interrelationships between such data structures and the computer-readable medium 130e (and other aspects of the system 100). Such interrelationships permit the data structures' functionality to be realized. Also, within such functional descriptive material, computer programs define structural and functional interrelationships between such computer programs and the computer-readable medium 130e (and other aspects of the system 100). Such interrelationships permit the computer programs' functionality to be realized.

For example, the processor 130a reads (e.g., accesses or copies) such functional descriptive material from the computer-readable medium 130e onto the memory device of the IHS 130, and the IHS 130 (more particularly, the processor 130a) performs its operations, as described elsewhere herein, in response to such material which is stored in the memory device of the IHS 130. More particularly, the processor 130a performs the operation of processing a computer application (that is stored, encoded, recorded, or embodied on a computer-readable medium) for causing the processor 130a to perform additional operations, as described elsewhere herein. Accordingly, such functional descriptive material exhibits a functional interrelationship with the way in which processor 130a executes its processes and performs its operations.

Further, the computer-readable medium 130e is an apparatus from which the computer application is accessible by the processor 130a, and the computer application is processable by the processor 130a for causing the processor 130a to perform such additional operations. In addition to reading such functional descriptive material from the computer-readable medium 130e, the processor 130a is capable of reading such functional descriptive material from (or through) the network 105 which is also a computer-readable medium (or apparatus). Moreover, the memory device of the IHS 130 is itself a computer-readable medium (or apparatus).

Figure 1C:
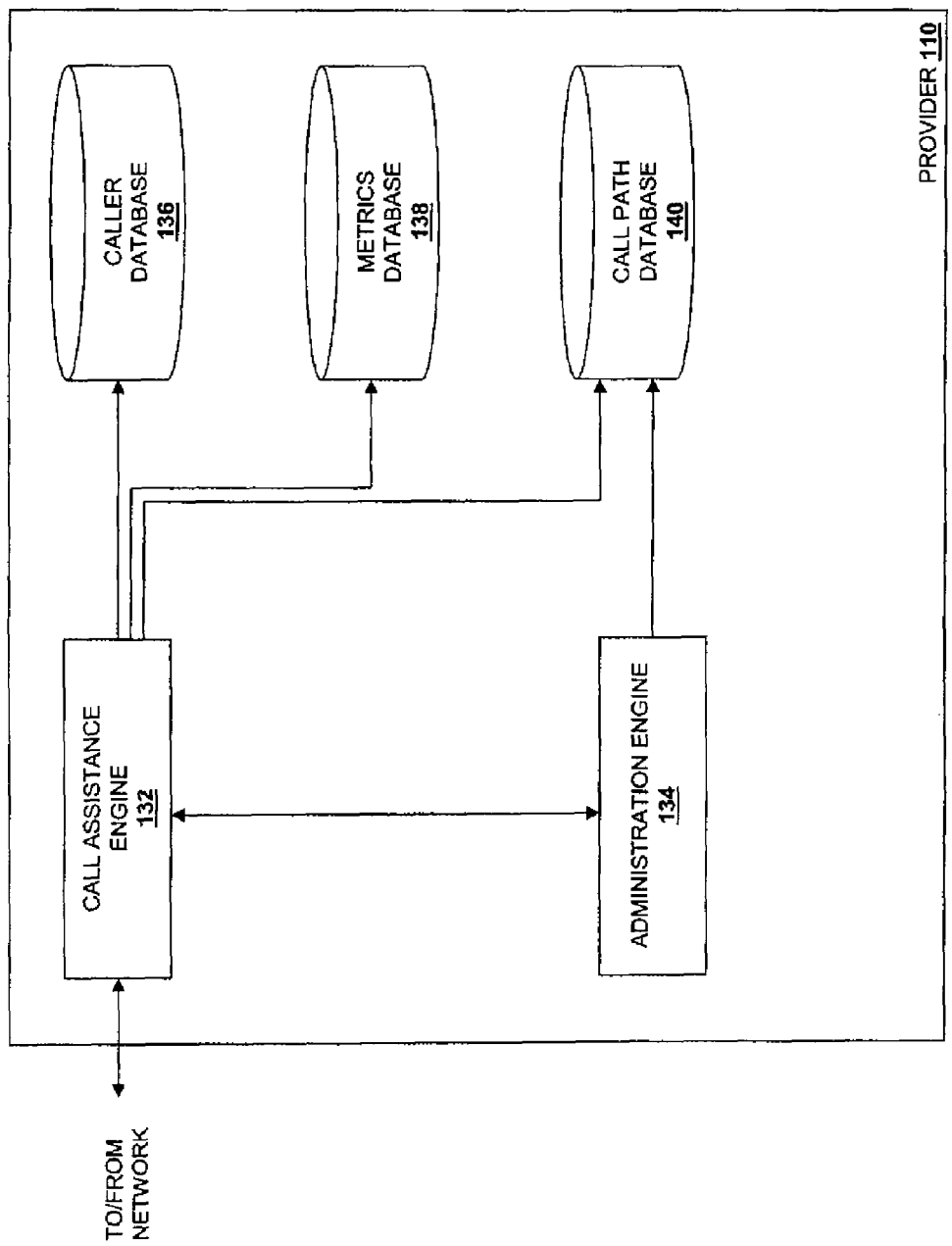
Figure 2A:
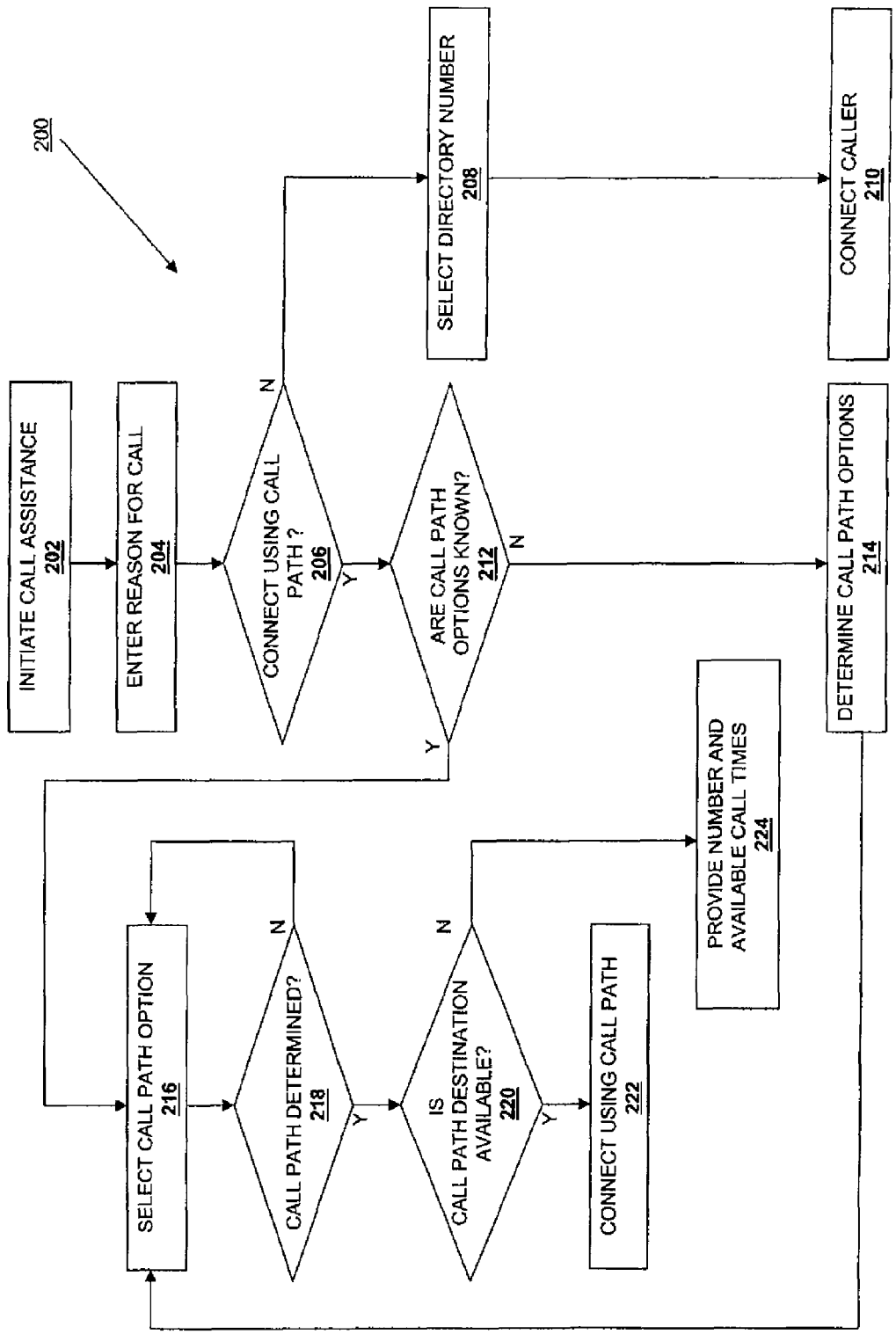
FIG. 2a is a flow chart illustrating an embodiment of a method to connect a call.
Figure 2B:
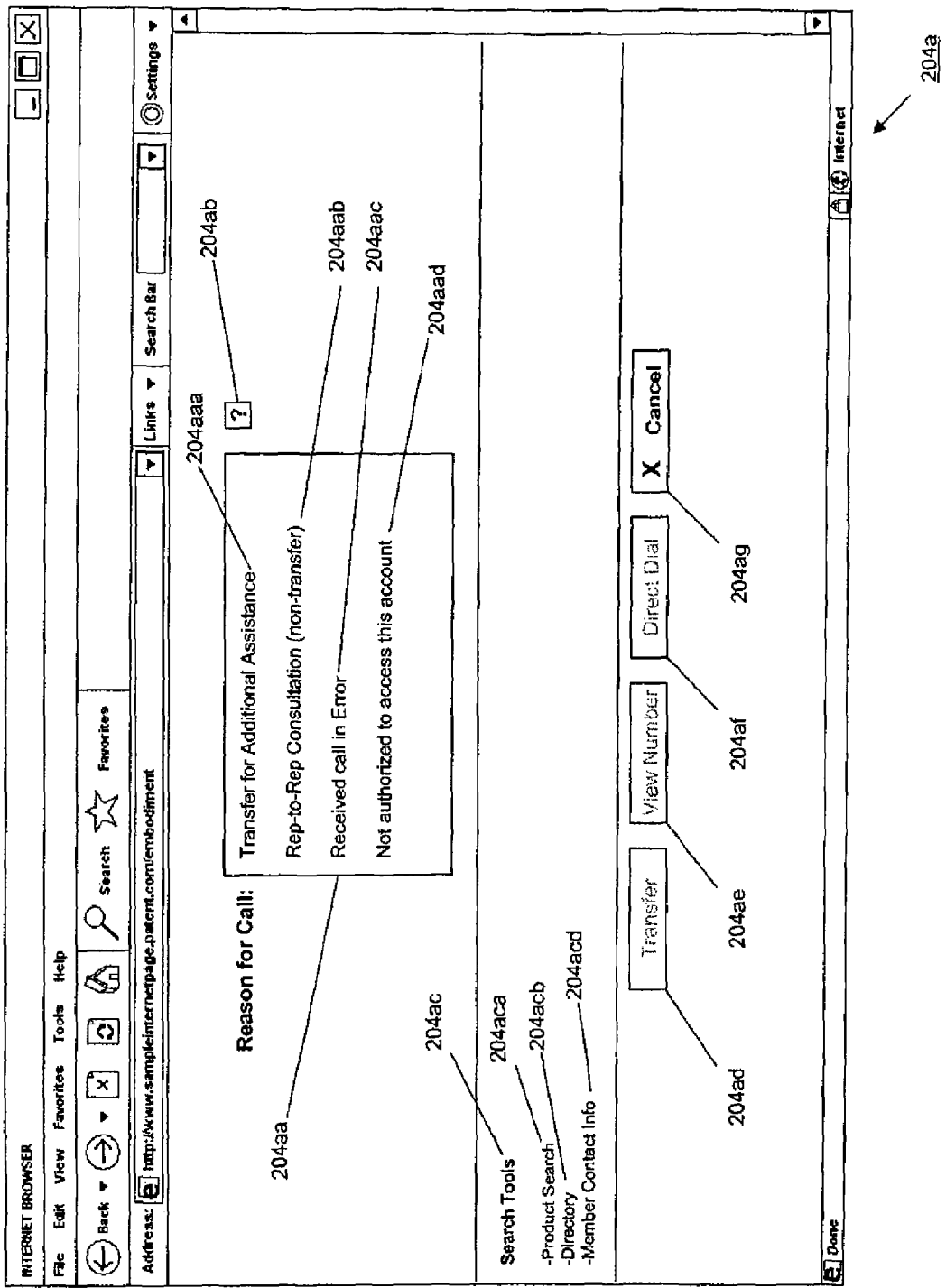
Figure 2C:
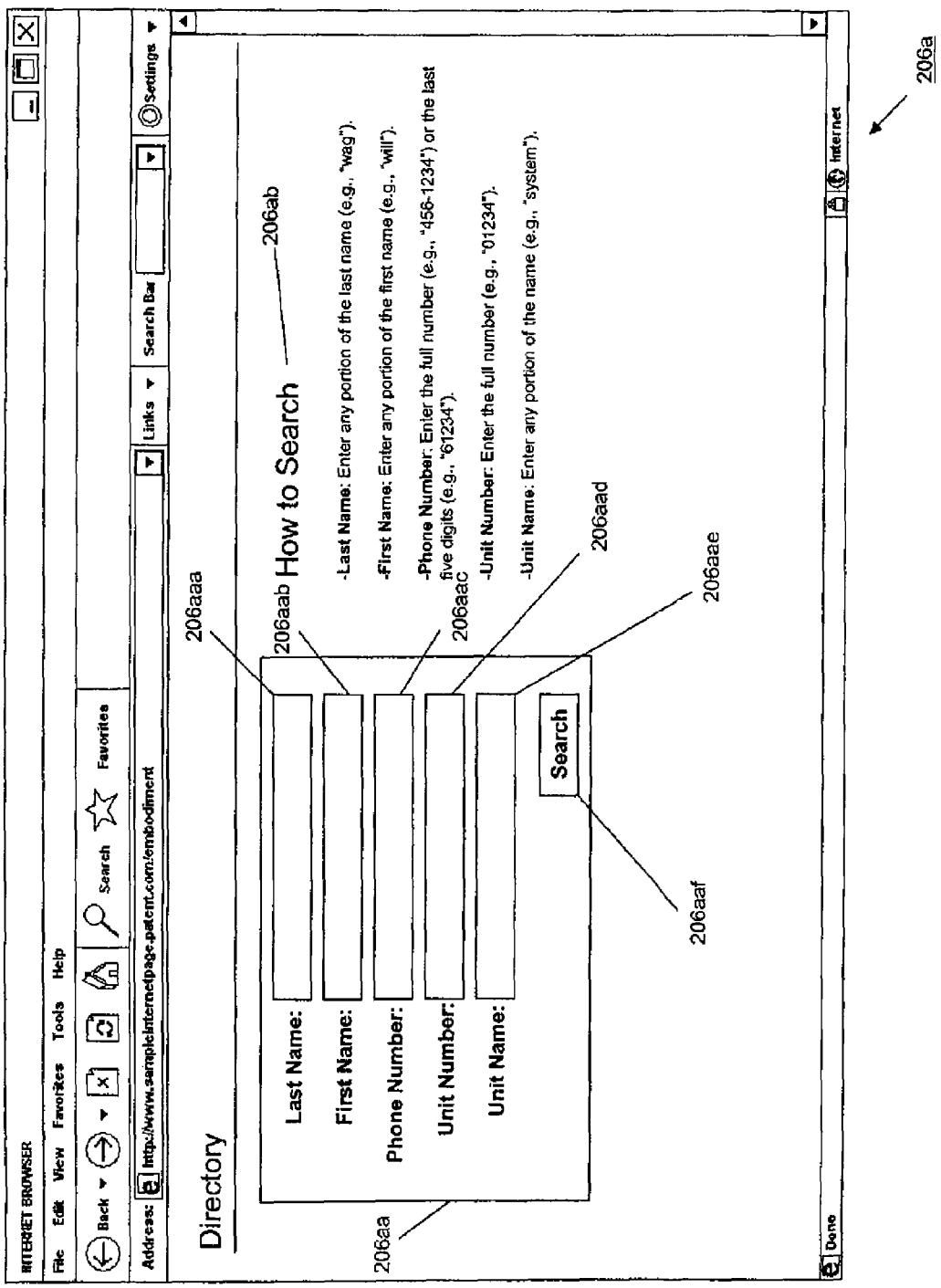
Figure 2D:
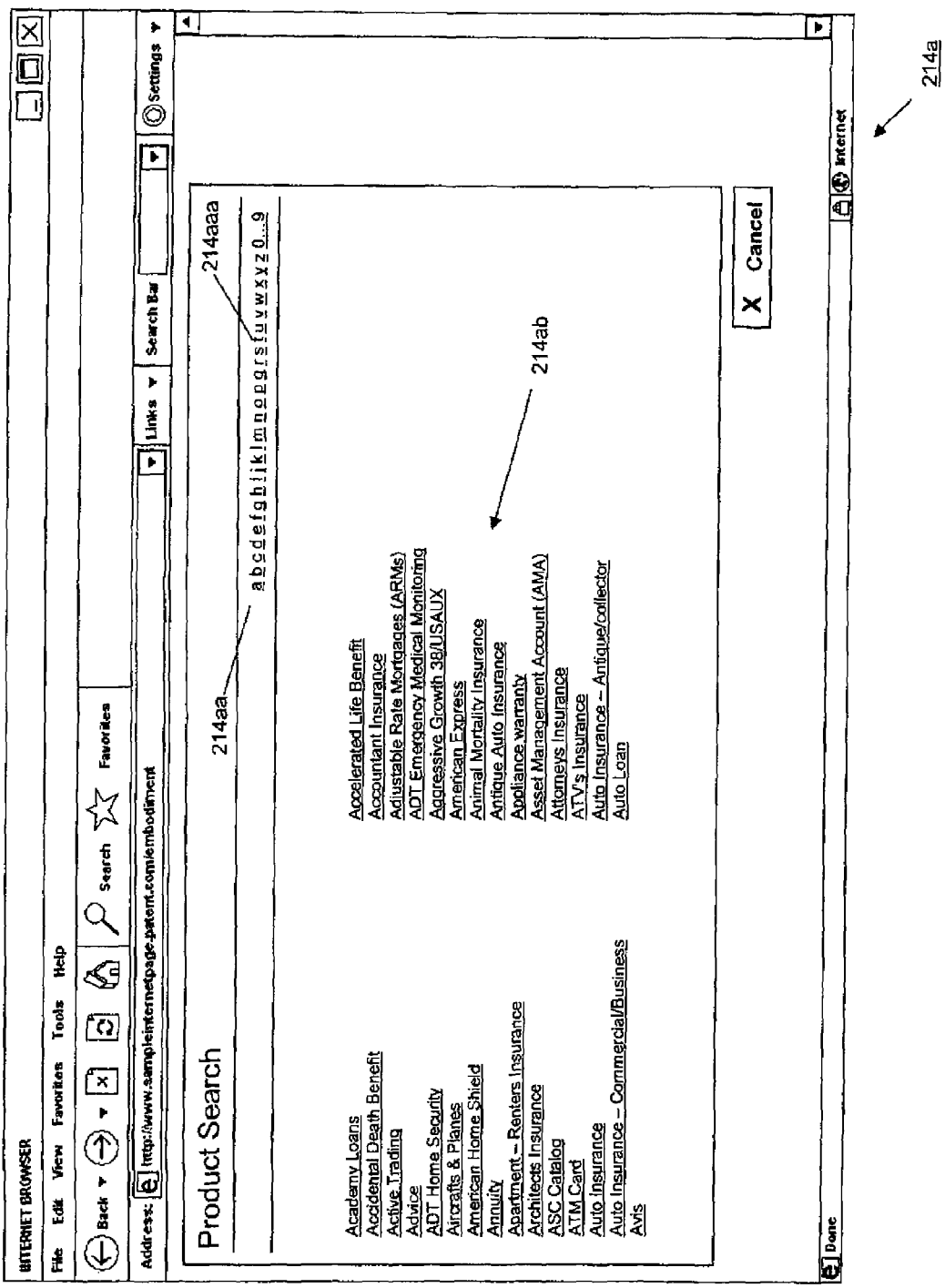
Figure 2E:
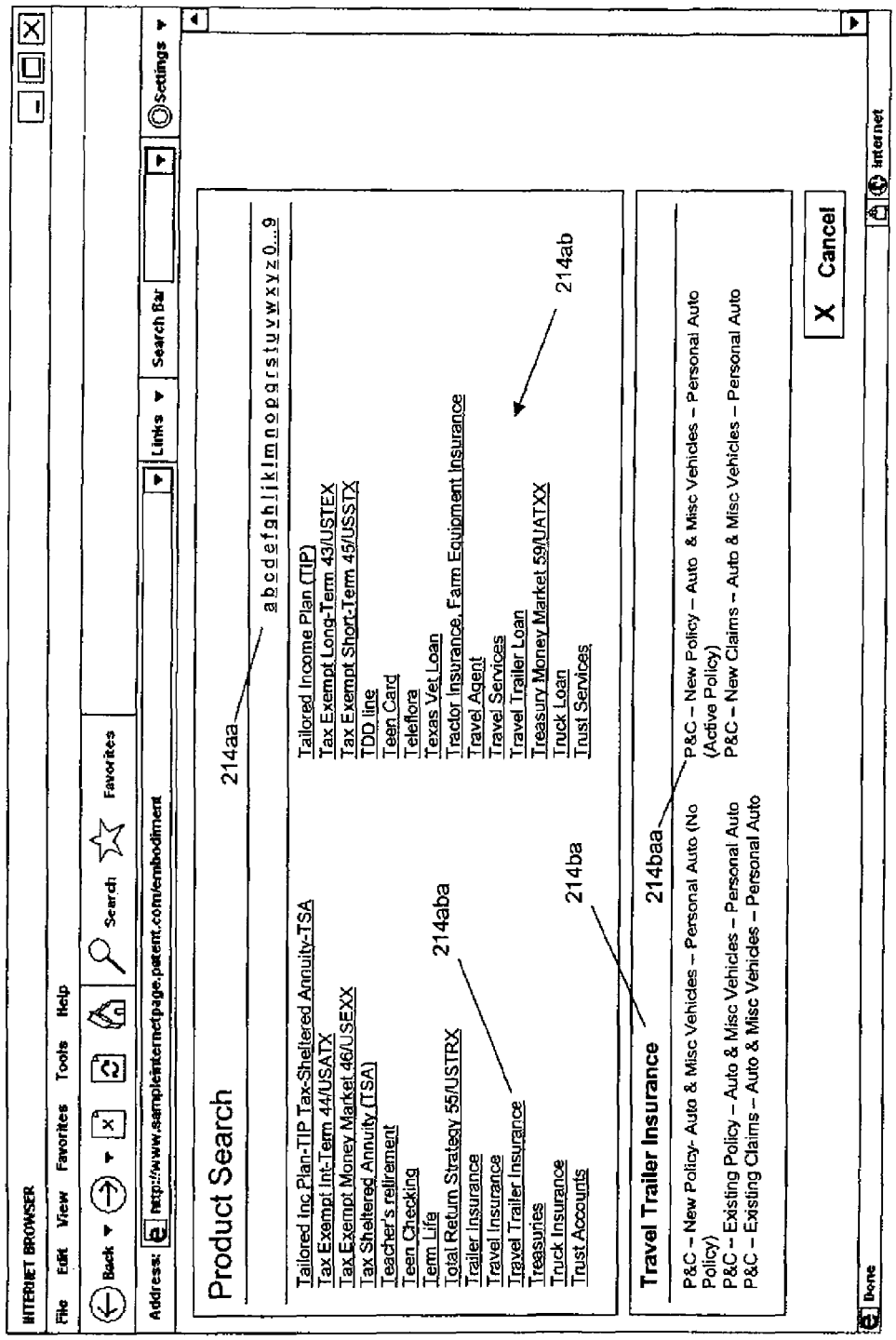
Figure 2F:
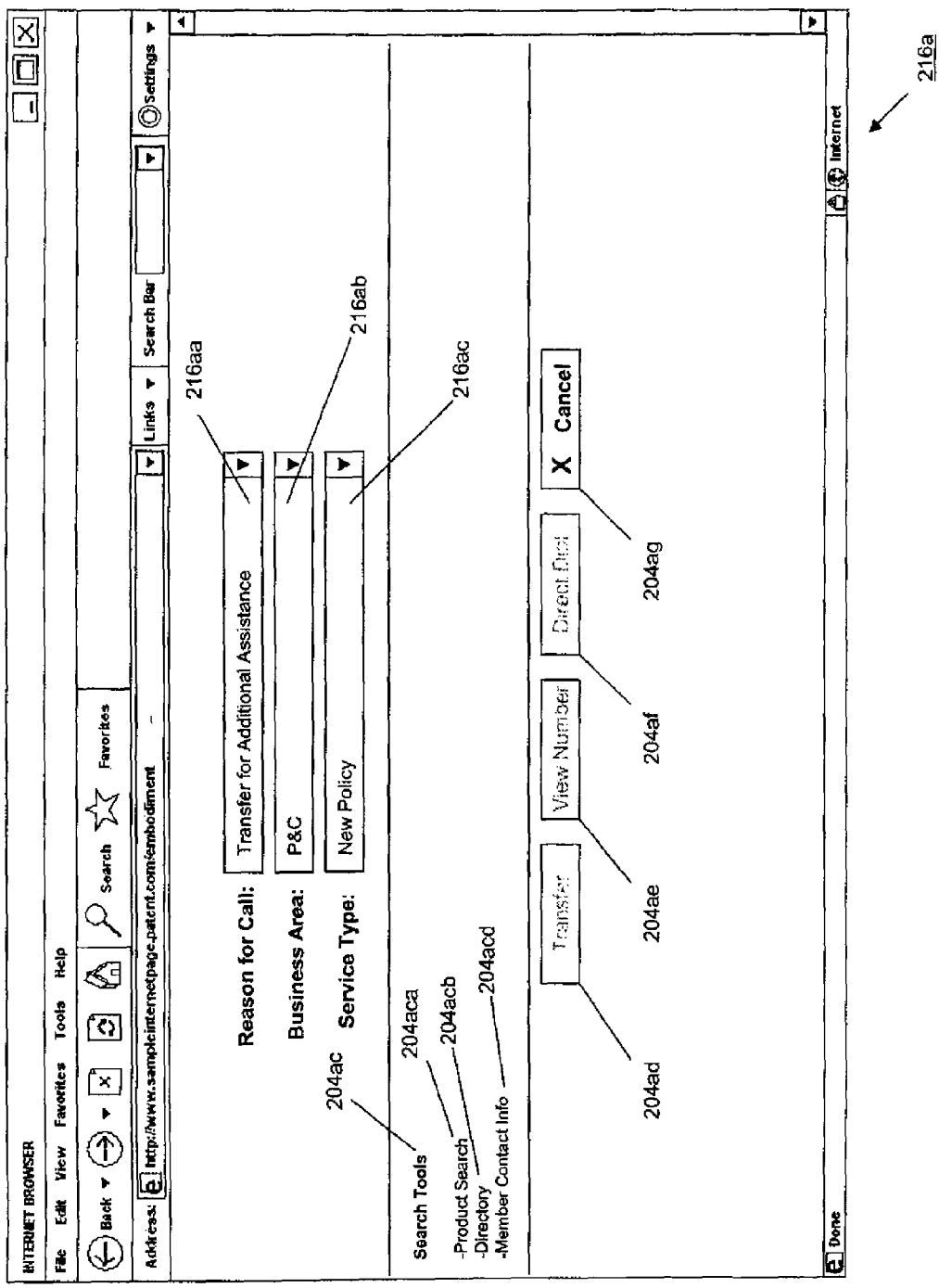
Figure 2G:
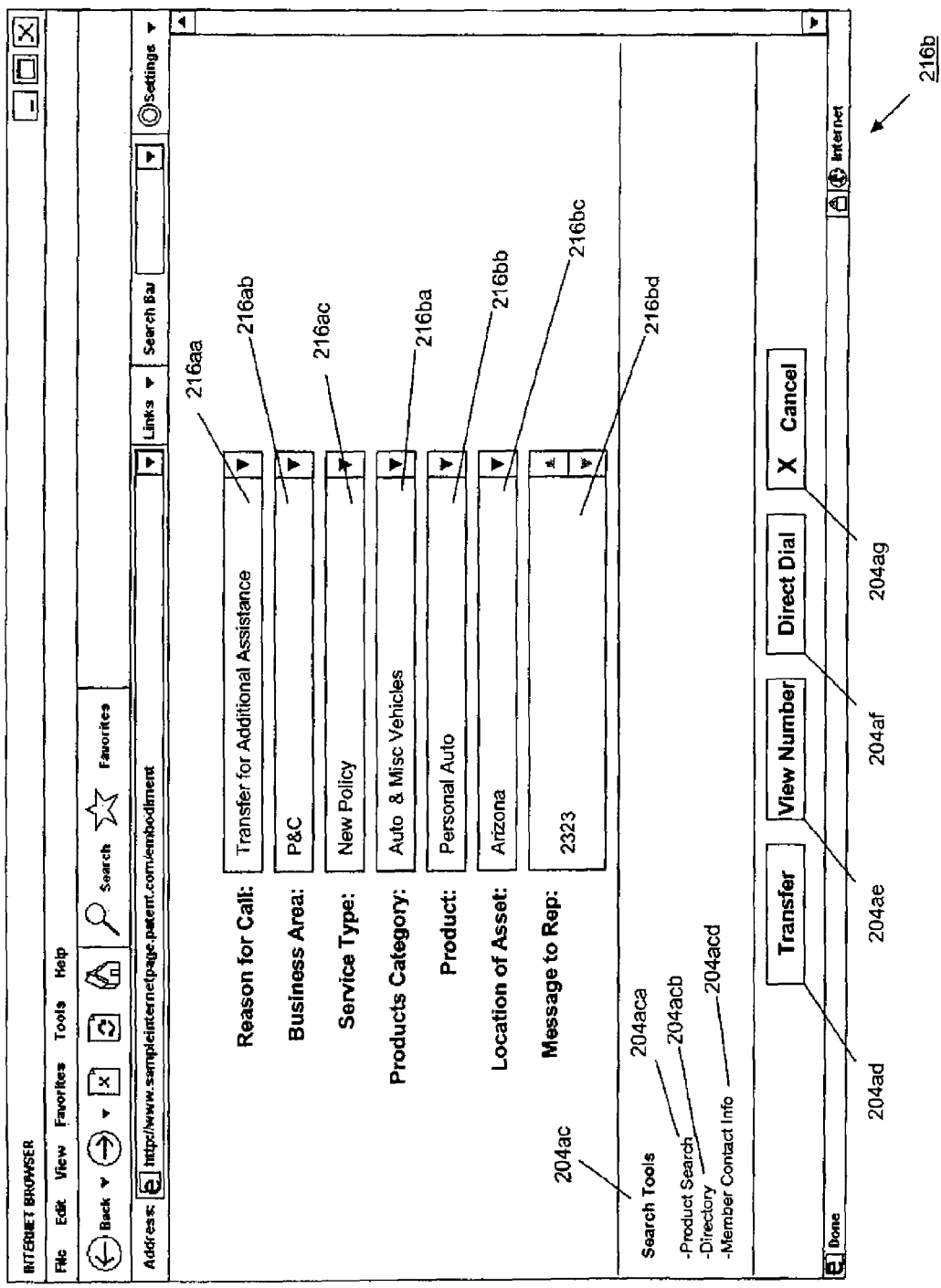
Figure 2H:
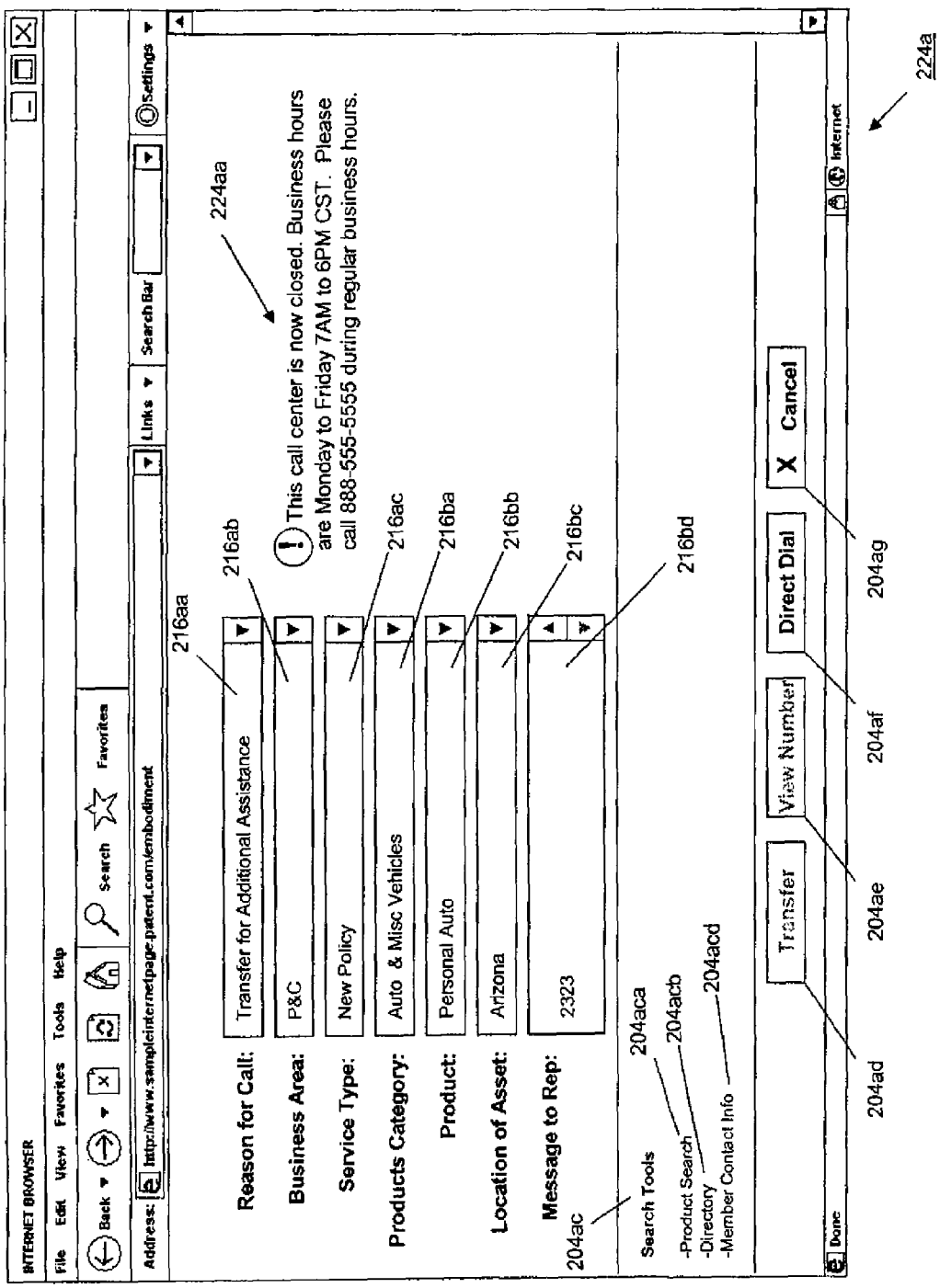

Referring now to FIGS. 1a, 1b and 1c, the provider 110 is illustrated in more detail. A call assistance engine 132 which may be, for example, software stored on the computer-readable medium 130e in the IHS 130, is included in the provider 110 and is operably coupled to the network 105. Call assistance engine 110a is also operable coupled to an administration engine 134, a caller database 136, a metrics database 138, and a call path database 140. The administration engine 134 which may be, for example, software stored on the computer-readable medium 130e in the IHS 130, is included in the provider 110 and is operably coupled to the call assistance engine 132 and to the call path database 140. In an embodiment, the caller database 136, the metrics database 138, and the call path database 140 are conventional databases known in the art. In an embodiment, the caller database 136, the metrics database 138, and the call path database 140 may be located outside the provider 110 and may still be operably coupled to the provider 110, the call assistance engine 132, and the administration engine 134 through, for example, the network 105.

In an embodiment, the caller database 136, the metrics database 138, and the call path database 140 each include a plurality of databases. In an embodiment, the provider 110 is a membership organization and the caller database 136 includes a variety of previously collected information about members of the membership organization. In an embodiment, the metrics database 138 includes a plurality of information about uses of the call assistance engine 132. In an embodiment, the call path database 140 includes call path options, call paths, call path destinations, call path destination numbers, caller classifications, and/or representative classifications, all of which will be described in more detail below. In an embodiment, the caller database 136, the metrics database 138, and the call path database 140 are publicly-available databases. In an embodiment, the caller database 136, the metrics database 138, and the call path database 140 are private databases which are available to be accessed by the provider 110.

Referring now to FIGS. 1a, 1b, 1c and 2a, a method 200 to connect a call is illustrated. The method 200 begins at block 202 where call assistance is initiated. Call assistance may be initiated when, for example, the caller 115 accesses the call assistance engine 132 through the Internet to determine a telephone number at which to call the provider 110; or when the caller 115 initially calls the provider 110; or when the caller 115 has already called the provider 110 and needs to be transferred to a call path destination different from that to which the caller 115 is already connected; and/or a variety of other call connection situations known in the art. The discussion below illustrates a situation where the caller 115 has already called the provider 110 and needs to be transferred to a call path destination different from that to which the caller 115 is already connected. However, one of skill in the art will recognize that other call connection situations will fall under the scope of this disclosure and may require additional options or removal of some of the options illustrated below.

In the illustrated embodiment, information about the caller 115 was collected upon the initial call from the caller 115 by, for example, obtaining that information from the caller 115; or through the call assistance engine 132 accessing the caller database 136 and acquiring previously collected information about the caller 115; and/or a variety of other methods known in the art. The call assistance engine 132 may determine the information about the caller 115 by searching the caller database 136 using the customer number of the caller 115. The customer number of the caller 115 may be, for example, a membership number of the caller 115, the phone number that the caller 115 is calling from, and/or a variety of other identifiers known in the art. The information about the caller 115 may include, for example, his/her name, address, contact information, employment information, products and/or service he/she has purchased from the provider 110, and/or a variety of other caller information known in the art. In an embodiment, the information about the caller 115 includes a caller classification that may include, for example, a member classification including information about what type of member the caller 115 is in a membership organization of the provider 110, an employee classification including information about what type of employee the caller 115 is in the business of the provider 110, a call history classification including information about the previous call history of that particular caller 115, and/or a variety of other classifications known in the art.

Referring now to FIGS. 1a, 1b, 1c, 2a and 2b, the method 200 proceeds to block 204 where a reason is entered for the call. In an embodiment, the call assistance engine 132 initially provides a metrics webpage 204a to collect the reason for the calf. In an embodiment, the caller 115 may access the metrics webpage 204a over the network 105 using the IHS 130 when the caller 115 is determining a telephone number at which to call the provider 110. In an embodiment, the metrics webpage 204 may be accessed by a representative 112 of the provider 110 when the caller 115 has initially called the provider 110 and has been connected to the representative 112. In the illustrated embodiment, the metrics webpage 204 is accessed by a representative 112 of the provider 110 when the caller has been connected to the provider 110 and wishes to be transferred to a call path destination different from that to which the caller 115 is already connected. Herein, a user of the metrics webpage 204a may refer to, for example, either the caller 115 or a representative 112 of the provider 110.

In an embodiment, the metrics webpage 204a includes a Reason for Call section 204aa including a plurality of reasons for the call such as, for example, a Transfer for Additional Assistance reason 204aaa, a Rep-to-Rep Consultation (non-transfer) reason 204aab, a Received Call in Error reason 204aac, and a Not Authorized to Access This Account reason 204aad. While the Reason for Call section 204aa is the only metrics category illustrated on the metrics webpage 204a, the metrics webpage 204a may include additional or different metrics categories such as, for example, a caller age category, a caller employment category, a caller location category, and/or a variety of other metrics categories known in the art.

A help box 204ab is located adjacent the Reason for Call section 204aa and is selectable by the user of the metrics webpage 204a to get help, for example, in determining what the categories in the Reason for Call section 204aa mean. A search tools section 204ac is located on the metrics webpage 204a and includes a Product Search link 204aca, a Directory link 204acb, and a Member Contact Info link 204acd. A Transfer link 204ad is located on the metrics webpage 204a and, in the illustrated embodiment, is deactivated such that it may not be selected by a user of the metrics webpage 204a. A View Number link 204ae is located on the metrics webpage 204a adjacent the Transfer link 204ad and, in the illustrated embodiment, is deactivated such that it may not be selected by a user of the metrics webpage 204a. A Direct Dial link 204af is located on the metrics webpage 204a adjacent the View Number link 204ae and, in the illustrated embodiment, is deactivated such that it may not be selected by a user of the metrics webpage 204a. A Cancel link 204ag is located on the metrics webpage 204a adjacent the Direct Dial link 204af.

In the illustrated embodiment, the representative 112 of the provider 110 is speaking with the caller 115 and the caller 115 wishes to be transferred to a call path destination different from that to which the caller 115 is already connected, so the representative 112 of the provider 110 selects the Transfer for Additional Assistance reason 204aaa. The call assistance engine 132 then sends the reason chosen, along with any other metrics data acquired, to the metrics database 138 where it may be associated with, for example, the caller 115, the time of the call, the number the caller 115 initially called, and/or a variety of other data points known in the art.

Referring now to FIGS. 1a, 1b, 1c, 2a, 2b and 2c, the method 200 proceeds to decision block 206 where it is determined whether the caller 115 will be connected using a call path. If it is determined that the caller 115 will not be connected using a call path, the method 200 proceeds to block 208 where a directory number is selected. For example, the caller 115 may know the name, phone number, or unit of the representative 112 of the provider 110 with whom they wish to speak, or the caller 115 may inform the representative 112 of the provider 110 that the caller 115 already knows the name, number, or unit of the representative 112 of the provider 110 with whom they wish to speak. The representative 112 of the provider 110 may then select the Directory link 204acb on the metrics webpage 204a. The call assistance engine 132 will then provide a directory webpage 206a including an input section 206aa and a How to Search section 206ab.

In an embodiment, the input section 206aa includes a Last Name input 206aaa, a first name input field 206aab, a Phone Number input field 206aac, a Unit Number input field 206aad, a Unit Name input field 206aae, and a Search link 206aaf. The user of the directory webpage 206a (e.g. the caller 115 or a representative 112 of the provider 110) may provide input in some or all of the inputs 206aaa-206aae and then select the Search link 206aaf to search the call path database 140 in order to find a direct transfer number to connect the caller 115. In an embodiment, the How to Search section 206ab provides assistance to the user of the directory webpage 206a concerning the type and format of information to be inputted into the inputs 206aaa-206aae. In an embodiment, providing information in one of the inputs 206aaa-206aae and selecting the Search link 206aaf will result in the call assistance engine 132 locating a direct transfer number that corresponds to a representative 112 of the provider 110, and the method 200 then proceeds to block 210 where the caller 115 is connected to that representative 112 of the provider 110 using the direct transfer number.

Referring now to FIGS. 1a, 1b, 1c, 2a, 2b, 2d and 2e, if at decision block 206 it is determined that the caller 115 will be connected using call paths, the method 200 proceeds to decision block 212 where it is determined whether the call path options are known. If the call path options are not known, the method 200 proceeds to block 214, where the call path options are determined. For example, the caller 115 may wish to receive information about a particular product. The representative 112 of the provider 110 may then select the Product Search link 204aca on the metrics webpage 204a. The call assistance engine 132 will then provide a product search webpage 214a, including an index section 214aa and a products section 214ab. In an embodiment, the caller 115 may search through the index section 214aa for the product that the caller 115 wishes to receive information on. In an embodiment, the representative 112 of the provider 110 may ask the caller 115 multiple questions to determine which product the caller 115 wants to receive information on.

For example, the caller 115 may be seeking information on Travel Trailer Insurance. The user of the product search webpage 214a (e.g., the caller 115 or a representative 112 of the provider 110) selects a T link 214aaa and the call assistance engine 132 then provides a product search webpage 214b with the products section 214ab displaying products beginning with the letter 'T'. The user of the product search webpage 214b (e.g., the caller 115 or a representative 112 of the provider 110) may then select the Travel Trailer Insurance link 214aba, and the call assistance engine 132 provides a Travel Trailer Insurance section 214ba including a plurality of options. The caller 115 may then select one of the options in the Travel Trailer Insurance section 214ba, or the representative 112 of the provider 110 may question the caller 115 to determine which of the options in the Travel Trailer Insurance section 214ba to select. The product search webpages 214a and 214b have been illustrated as an example of determining the call path options at block 214 of the method 200. One of skill in the art will recognize that a product index is only an example of the variety of different information that may be used to determine a call path.

Referring now to FIGS. 1a, 1b, 1c, 2a, 2b, 2e, 2f, 2g and 2h, after determining the call path options at block 214, the method 200 then proceeds to block 216, where a call path option is selected. In an embodiment, after the user of the product search webpage 214b (e.g., the caller 115 or a representative 112 of the provider 110) selects option 214baa under the Travel Trailer Insurance section 214ba, the call assistance engine 132 provides a call path options webpage 216a that is pre-populated with information from option 214baa. In an embodiment, if at decision block 212 it is determined that the call path options are known, the call assistance engine 132 provides the call path options webpage 216a. In the illustrated embodiment, the call path options webpage 216a initially includes a Reason for Call input field 216aa and a Business Area input field 216ab, while retaining from the metrics webpage 204a the Search Tools section 204ac with the links 204aca, 204acb and 204acc, as well as the deactivated view number link 204ae, the deactivated direct dial link 204af, and the cancel link 204ag. In an embodiment, the Reasons for Call input field 216aa was selected in block 204 of the method 200 and may be changed using the Reasons for Call input field 216aa on the call path options webpage 216a. In an embodiment, the Business Area input field 216ab is pre-populated due to the selection of option 214baa in the Travel Trailer Insurance section 214ba on product search webpage 214b. In an embodiment, the user of the call path options webpage 216a (e.g., the caller 115 or a representative 112 of the provider 110) determines the appropriate selection for the Business Area input field 216ab (e.g., "P & C"). In an embodiment, input fields on the call path options webpage 216a are drop-down menus, each providing a plurality of selections for each input field.

The method 200 then proceeds to decision block 218 where the call assistance engine 132 determines whether a call path has been determined. In an embodiment, a call path includes a series of call path options that results in a call path destination. For each input selected on the call path options webpage 216a, the call assistance engine 132 may access the call path database 140 and determine whether the selected inputs (that represent call path options) correspond to a call path destination. If there is no call path destination for the inputs selected (i.e. the call path has not been determined), the call assistance engine 132 will provide an additional input fields for the user of the call path options webpage 216a (e.g., the caller 115 or a representative 112 of the provider 110) to select. In an embodiment, if a call path has not been determined, each selection for a given input field on the call path options webpage 216a will result in the call assistance engine 132 determining the next category of call path information that is needed and providing an input field for such information on the call path option webpage 216a. For example, in an embodiment where call path options were known at decision block 212, once the Reason for Calf input field 216aa is selected at block 204 of the method 200, the call assistance engine 132 provides only the Business Area input field 216ab as a call path option for selection.

Once the user of the call path options webpage 216a (e.g. the caller 115 or a representative 112 of the provider 110) selects a business area for the Business Area input field 216ab (e.g., "P&C"), the method 200 proceeds to decision block 218 and the call assistance engine 132 checks the call path database 140 and determines that there is no call path destination for a call path with only the input provided in that Business Area input field 216ab. The method 200 then returns to block 216, where the call assistance engine 132 then determines that a service type category is needed, and provides a Service Type input field 216ac as a call path option for selection. In an embodiment, the Service Type input field 216ac was pre-populated due to the selection of option 214baa in the Travel Trailer Insurance section 214ba on the product search webpage 214b. During the selection of the call path options on the call path options webpage 216a (and call path options webpage 216b, below), the Transfer link 204ad, the View Number link 204ae and the Direct Dial link 204af will remain deactivated such that they may not be selected unless a call path destination is available. The call assistance engine 132 will keep providing input fields for call path options until enough call path options are selected to provide a call path corresponding to a call path destination. In an embodiment, the inputs for the call path options may include product inputs specifying a type of product, and/or product problem inputs specifying problems that may be associated with the product call path option selected.

For example, once the user of the call path options webpage 216a (herein, a user of the call path options webpage 216a may refer to, for example, the caller 115 or a representative 112 of the provider 110) selects a service type for the Service Type input field 216ac (e.g. "New Policy"), or if the Service Type input field 216ab was pre-populated, the method 200 proceeds to decision block 218. At decision block 218, the call assistance engine 132 checks the call path database 140 and determines that there is no call path destination for a call path having only the given input in the Business Area input field 216ab and the given input in the Service Type input field 216ac as call path options. The method 200 then returns to block 216, where the call assistance engine 132 determines that a products category is needed, and provides a call path options webpage 216b with a Products Category input field 216ba as a call path option for selection.

Once the user of the webpage 216b selects a product category for the Product Category input field 216ba (e.g., "Auto & Misc. Vehicles"), the method 200 again proceeds to decision block 218. At decision block 218, the call assistance engine 132 again checks the call path database 140, and determines that there is no call path destination for a call path having only the given input in the Business Area input field 216ab, the given input in the Service Type input field 216ac, and the given input in the Products Category input field 216ba as call path options. The method 200 then returns to block 216 where the call assistance engine 132 determines that an additional product category is needed, and provides a Product input field 216bb as a call path option for selection.

Once the user of the call path options webpage 216b selects a product for the Products Category input field 216bb (e.g., "Personal Auto"), the method 200 yet again proceeds to decision block 218. At decision block 218, the call assistance engine 132 yet again checks the call path database 140 and determines that there is no call path destination for a call path having only the given input in the Business Area input field 216ab, the given input in the Service Type input field 216ac, the given input in the Products Category input field 216ba, and the given input in the Product input field 216bb as call path options. The method 200 then returns to block 216 where the call assistance engine 132 then determines that a location of asset category is needed, and provides a Location of Asset input field 216bc as a call path option for selection.

Once the user of the call path options webpage 216b selects a location of asset for the Location of Asset input field 216bc (e.g., "Arizona"), the method 200 again proceeds to decision block 218. At decision block 218, the call assistance engine 132 again checks the call path database 140 and determines that there is a call path destination for a call path with the given input in the Business Area input field 216*ab*, the given input in the Service Type input field 216*ac*, the given input in the Products Category input field 216*ba*, the given input in the Product input field 216*bb*, and the given input in the Location of Asset input field 216*bc* as call path options. Thus, a call path destination may be determined by using call path options selected on the call path options webpages 216*a* and 216*b* to build a call path, input by input. While the inputs for the call path options have been illustrated and described for connecting the caller 115 to a representative 112 of the provider 110 within the provider 110, one of skill in the art will recognize that inputs for call path options may be used that would result in a call path destination that would connect the caller 115 to a third party provider that is located outside of the provider 110.

In an embodiment, once the call path destination is determined, the call assistance engine 132 may check the call path database 140 to determine which representatives 112 of the provider 110 are accessible through the call path destination determined at decision block 218. For each of the representatives 112 of the provider 110 accessible through the call path destination, a representative 112 classification may be retrieved from the call path database 140. In an embodiment, the representative 112 classification may include, for example, a security classification that includes information on the licensing authorization of the representative 112, a privacy classification that includes information on which callers the representative 112 is authorized to speak with, a VIP member classification that includes the level of members in a membership organization of the provider 110 that the representative 112 is allowed to speak with, and/or a variety of other classifications known in the art. In an embodiment, the call assistance engine 132 reviews the caller classification determined in block 202 of the method 200, and compares that caller classification to the representative 112 classification to determine which representatives 112 of the provider 110 that are accessible using the call path destination are classified to speak with the caller 115, and/or if the caller 115 is classified to speak with the representative 112 of the provider 110. In an embodiment, a plurality of representatives 112 of the provider 110 will be accessible using the call path destination, but only a subset of that plurality of representatives 112 will be classified to speak with the caller 115 based on at least one of the caller classification and the representative 112 classification. For example, the caller 115 may be an employee of the provider 110, and may be calling to discuss salary information. The caller classification and the representative 112 classification may be configured to ensure that only representatives 112 who are classified to service the caller 115 are classified as being allowed to speak with the caller 115 about salary information. In an embodiment, representatives 112 that are classified to service the caller 115 may be senior to the caller in terms of experience or job title. In an embodiment, representatives 112 that are classified to service the caller 115 may be a set of employees that have been authorized to service certain callers. In another example, the caller 115 may be a VIP member of a membership organization of the provider 110 having accounts with the provider that exceed a predetermined threshold, and the caller classification and the representative 112 classification may be configured to ensure that only representatives 112 who are trained to deal with such members are classified as being allowed to speak with the caller 115. In another example, the caller 115 may be a celebrity, politician, or other high-profile individual, and the caller classification and the representative 112 classification may be configured to ensure that only representatives 112 who are cleared to have personal information of such members disclosed to them are classified as being allowed to speak with the caller 115.

Upon determination of a call path that corresponds to a call path destination, the method 200 proceeds to decision block 220 where the call assistance engine 132 determines whether the call path destination is available, for example, by accessing information stored in the call path database 140. In an embodiment, if the call path destination is available, the Transfer link 204*ad*, the View Number link 204*ae* and the Direct Dial link 204*af* are activated by the call assistance engine 132 such that they may be selected by the user of the call path options webpage 216*b*, and the call assistance engine 132 provides a Message to Rep input field 216*bd*. A representative 112 of the provider 110 may input a note or a code in the Message to Rep input field 216*bd* (e.g. "2323") in order to pass information about the caller 115 to the representative 112 of the provider 110 that the caller 115 is about to be transferred to. The method 200 then proceeds to block 222, where the caller 115 is connected using the call path. The user of the call path options webpage 216*b* may select the Transfer link 204*ad*, and the call assistance engine 132 may use the calf path destination resulting from any or all of the call path determined at decision block 218, the caller classification, and/or the representative 112 classification, to find a call path destination number (CPDN). The CPDN is a phone number stored in the call path database 140, to connect the caller 115 with a representative 112 of the provider 110 or with a third party provider located outside of the provider 110. In an embodiment, the call path database 140 provides a single repository for all phone numbers that the caller 115 may need to connect to during a call to the provider 110. In an embodiment, the user of the call path options webpage 216*b* may select the View Number link 204*ae* to view the call path destination number corresponding to the call path destination without being connected to the call path destination. In an embodiment, the user of the call path options webpage 216*b* may select the Direct Dial link 204*af* to directly dial a number using the call assistance engine 132.

If at decision block 220 the call assistance engine 132 determines that the call path destination is not available, the method 200 proceeds to block 224 where a phone number and available call times are provided. The call assistance engine 132 checks the call path database 140 and, upon determining that the call path destination is unavailable, retrieves a call-back number and an hours of operation associated with that call path destination. The call assistance engine 132 then provides a destination unavailable webpage 224*a*, illustrated in FIG. 2*h*, that includes a number and available call time information 224*aa* that displays the call-back number and hours of operation associated with that call path destination. The Transfer link 204*ad* and the View Number link 204*ae* are deactivated such that transfer to an unavailable call destination is not possible, while the Direct Dial link 204*af* is activated such that, for example, the user of the destination unavailable webpage 224*a* (e.g. the caller 115 or a representative 112 of the provider 110) may use the call assistance engine 132 to call and leave a message at the unavailable call path destination.

Referring now to FIGS. 1*a*, 1*b*, 1*c* and 3, the administration engine 134 will be described in reference to webpages generated by the administration engine 134 that are used to administer the functions of the call assistance engine 132. In an embodiment, the administration engine 134 may provide an administration webpage 300 that includes an Add New Call Path link 300*aa*, an Add/Edit CPDN link 300*ab*, an Edit an Existing Call Path link 300*ac*, and an Add/Edit Referral CPDN link 300*ad*. As described above, a call path is a series of call path options that result in a call path destination. A call path destination number corresponds to the call path destination. The administration engine 134 allows the call paths (and hence, the call path destinations) and the call path destination numbers to be created and edited. For example, the call path destination described above with reference to FIG. 2g includes a Business Area input field 216ab, Service Type input field 216ac, Product Category input field 216ba, Product input field 216bb, and Location of Asset input field 216bc. This call path destination could be created using the Add New Call Path link 300aa by associating a call path destination number with the series of call path options that create the call path destination, defining the hours of operation for that call path destination, and providing any additional desired information on that call path destination.

Figure 3:
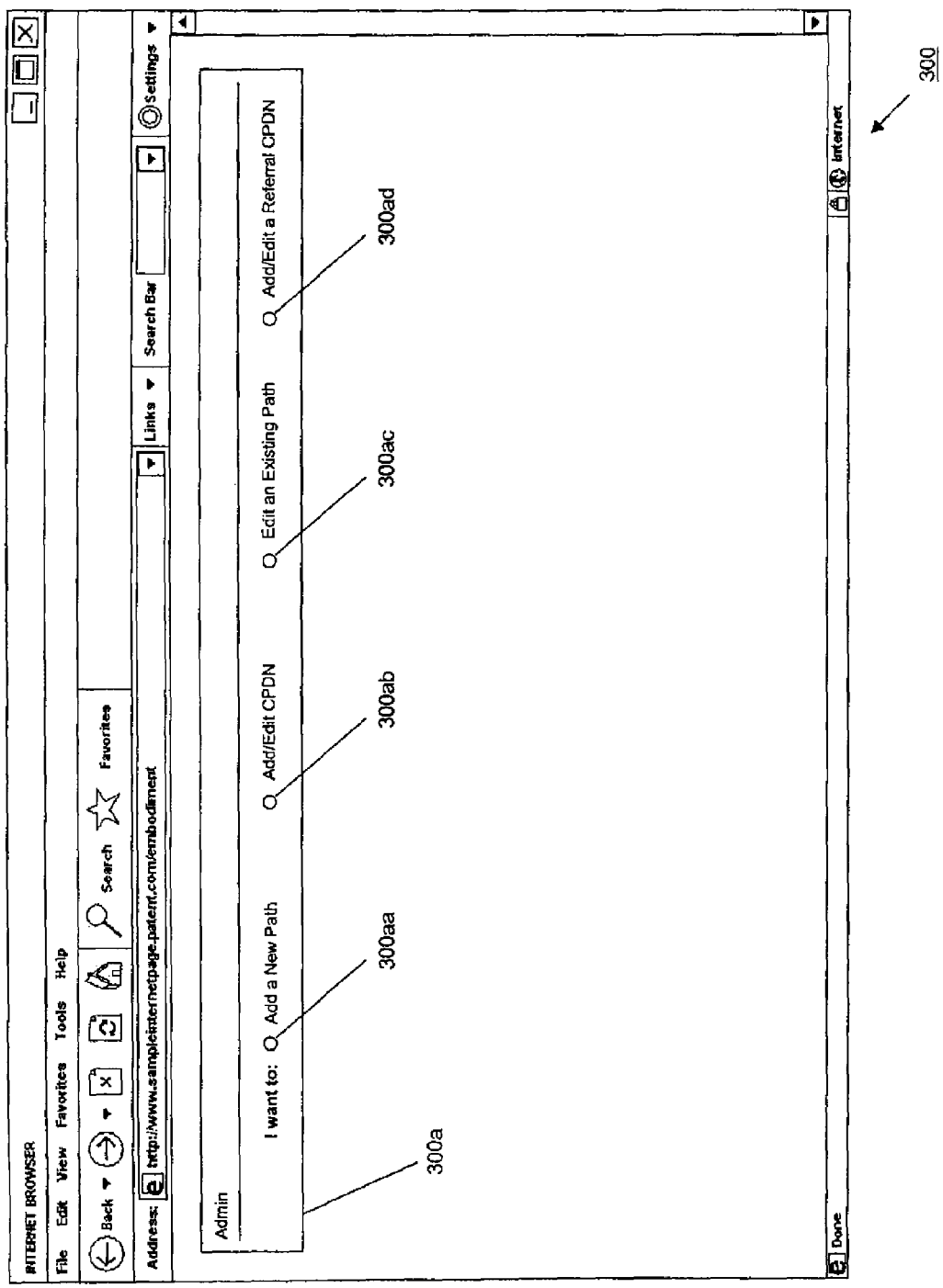
FIG. 3 is a screenshot illustrating an embodiment of an administration webpage used with the administration engine of FIG. 1c.
Figure 4A:
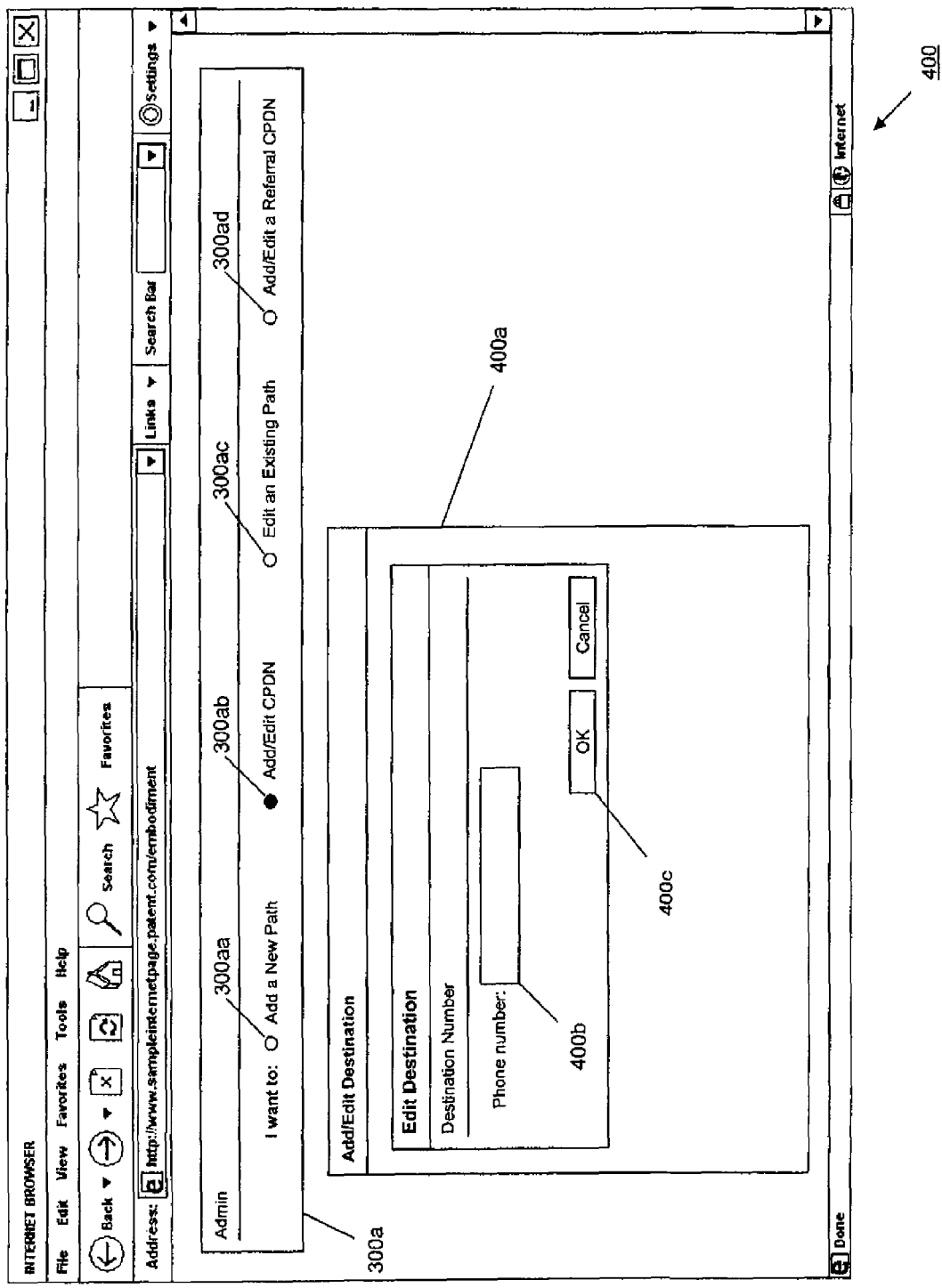
FIG. 4a is a screenshot illustrating an embodiment of an add/edit call path destination number webpage used with the administration engine of FIG. 1c.
Figure 4B:
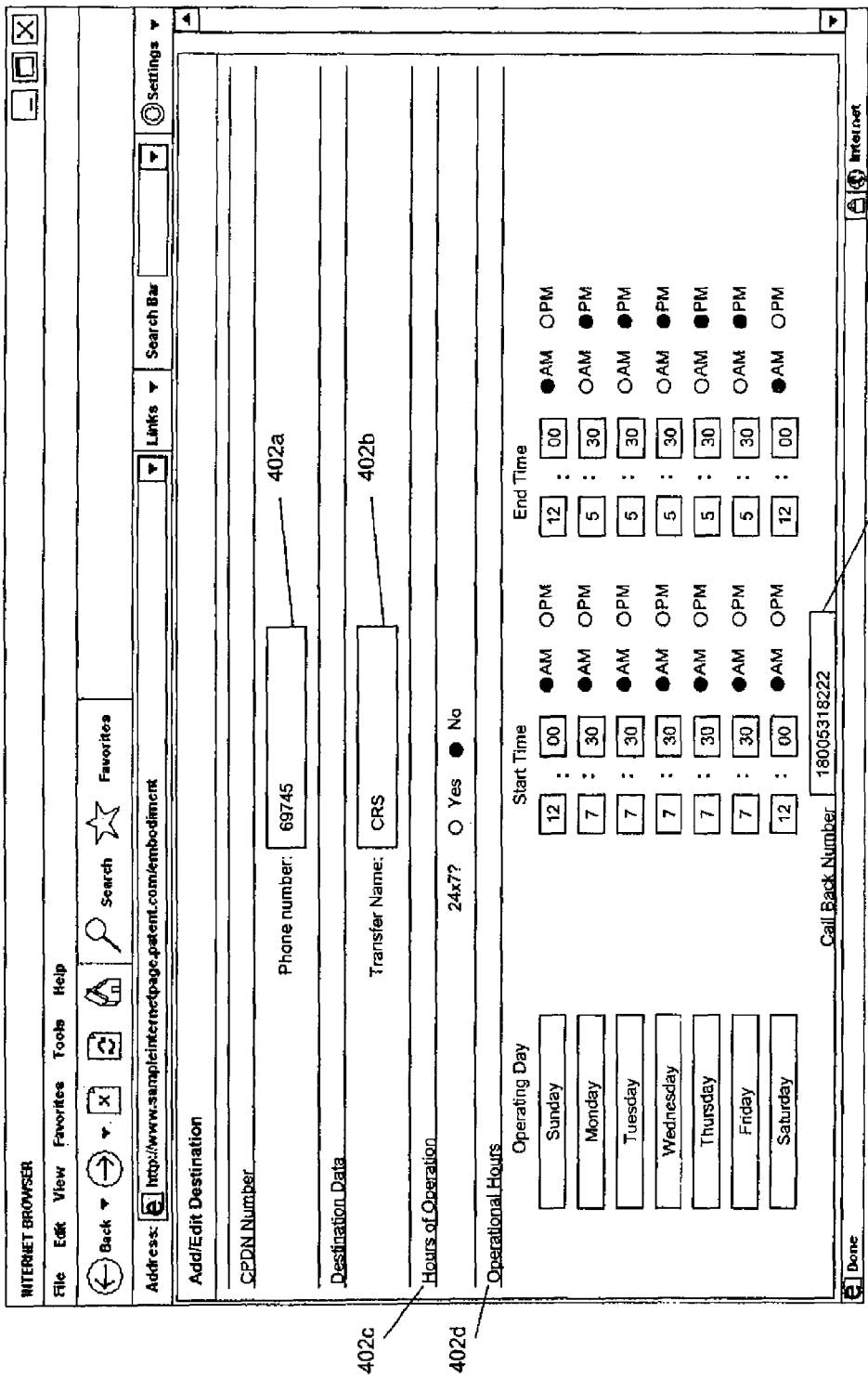
FIG. 4b is a screenshot illustrating an embodiment of an add/edit call path destination number webpage used with the administration engine of FIG. 1c.
Figure 4C:
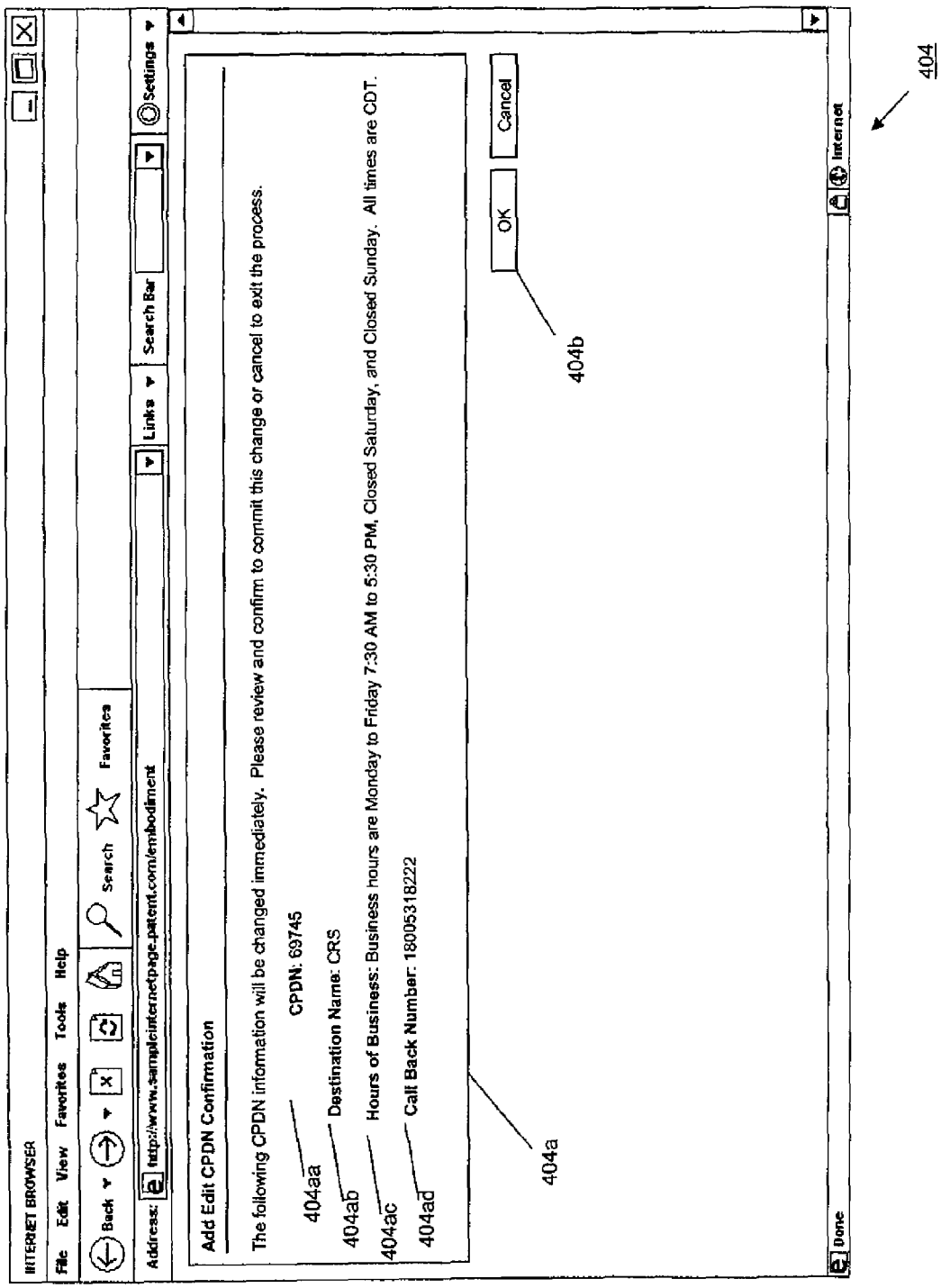
FIG. 4c is a screenshot illustrating an embodiment of a confirmation webpage used with the administration engine of FIG. 1c.

Referring now to FIGS. 1a, 1b, 1c, 3, 4a, 4b and 4c, if the Add/Edit CPDN link 300ab is selected on the administration webpage 300, the administration engine 134 provides an add/edit call path destination number webpage 400, illustrated in FIG. 4a, with an Add/Edit Destination box 400a including a Phone Number input field 400b and an OK submit 400c. The user of the add/edit call path destination number webpage 400 may input a call path destination number in the Phone Number input field 400b and select the OK submit 400c in order to either add a new call path destination number or edit an existing call path destination number. For example, if the call path destination number 69745 is entered in the Phone Number input field 400b, the administration engine 134 provides an add/edit call path destination number webpage 402, illustrated in FIG. 4b, including a CPDN input field 402a, a Transfer Name input field 402b, an Hours of Operation section 402c, a Operational Hours input section 402d, and a Call Back Number input field 402e. If the call path destination number is an existing call path destination number, the Transfer Name input field 402b, Hours of Operation section 402c, Operational Hours input section 402d, and Call Back Number input field 402e will be pre-filled and may be modified by the user of the add/edit call path destination number webpage 402. If the call path destination number is a new call path destination number, the Transfer Name input field 402b, Hours of Operation section 402c, Operational Hours input section 402d, and Call Back Number input field 402e will be entered by the user of the add/edit call path destination number webpage 402. In an embodiment, the Transfer Name input field 402b indicates the call path destination that the input in the CPDN input field 402 corresponds to, and may correspond to a plurality of call paths each made up of call path options. In an embodiment, the Hours of Operation section 402c allows the user of the add/edit call path destination number webpage 402 to indicate whether the call path destination is always available and, if not, the Operational Hours input section 402d allows the operational hours to be set or edited. In an embodiment, the Call Back Number input 402e allows the user of the add/edit call path destination number webpage 402 to provide a call-back number for the call path destination in the event the caller is attempting to connect to that call path destination outside of its hours of operation. Upon adding or editing the information about the call path destination number on the add/edit call path destination number webpage 402, the administration engine 134 provides a confirmation webpage 404, illustrated in FIG. 4c, having a confirmation box 404a and an OK submit 404b. The confirmation box 404a includes a CPDN confirmation 404aa, a Destination Name confirmation 404ab, a Operational Hours confirmation 404ac, and a Call Back Number confirmation 404ad. If the confirmations 404aa, 404ab, 404ac and 404ad in the confirmation box 404a are correct, a user of the confirmation webpage 404 may select the OK submit 404b to either add or edit the call path destination number.

Figure 5A:
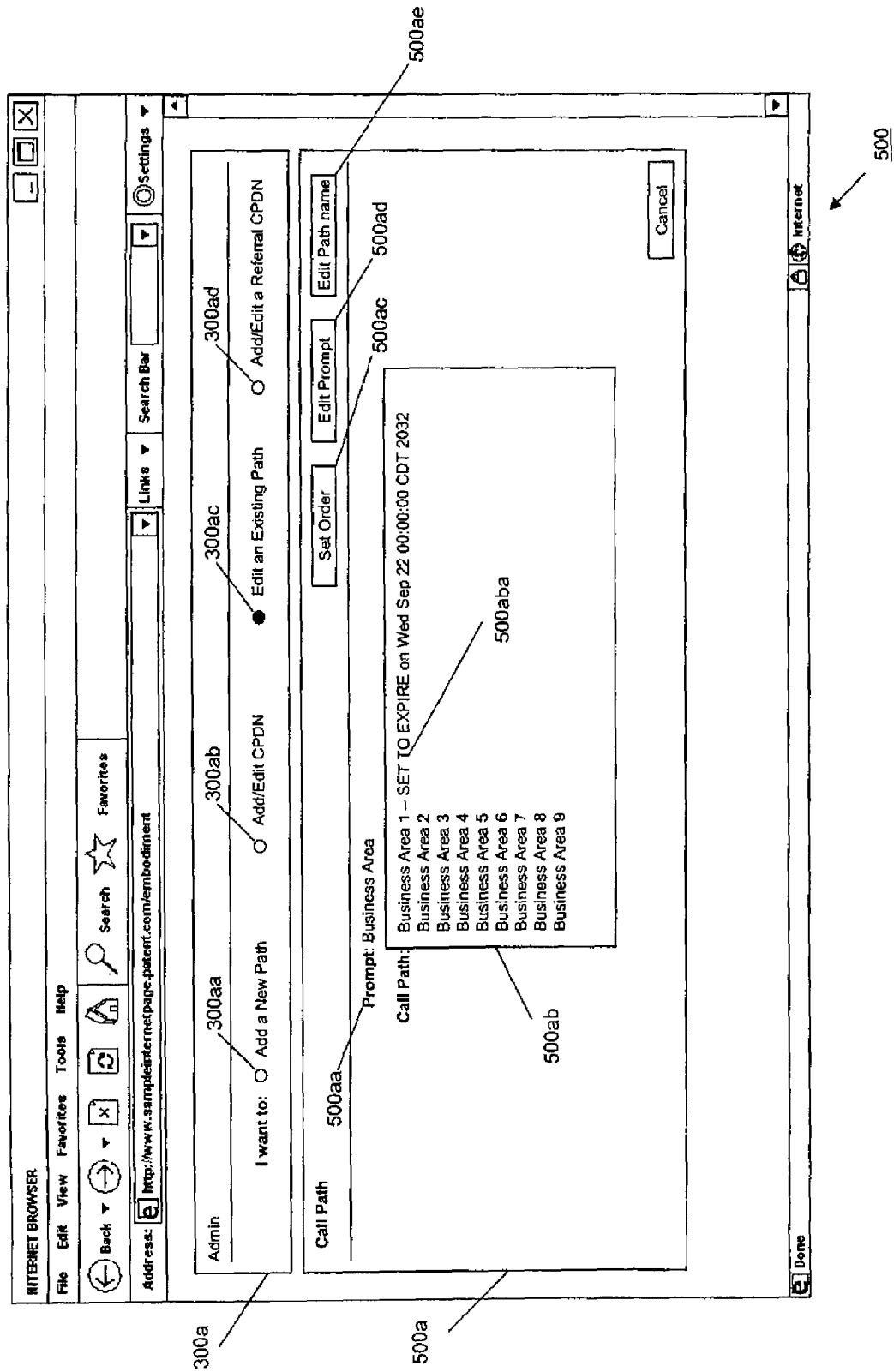
FIG. 5a is a screenshot illustrating an embodiment of an existing call path webpage used with the administration engine of FIG. 1c.

Referring now to FIGS. 1a, 1b, 1c, 3 and 5a, if the Edit an Existing Call Path link 300ac is selected on the administration webpage 300, the administration engine 134 provides an edit an existing call path webpage 500, illustrated in FIG. 5a, having a call path box 500a. The call path box 500a includes a prompt 500aa, a call path order box 500ab, a set order link 500ac, an edit prompt link 500ad, and an edit path name link 500ae. In an embodiment, the prompt 500aa refers to refers to one of the categories of call path options (e.g. "Business Area") that may be displayed on the call path options webpages 216a and 216b, described above with reference to FIGS. 2g and 2h. In an embodiment, the Call Path Order box 500ab displays the options, and the order of those options, that will become available in a drop down menu when a given category of the call path option associated with the prompt 500aa is provided on the call path options webpages 216a and 216b. In an embodiment, options in the call path order box 500ab may include notes such as, for example, note 500aba that an option is set to expire.

Figure 5B:
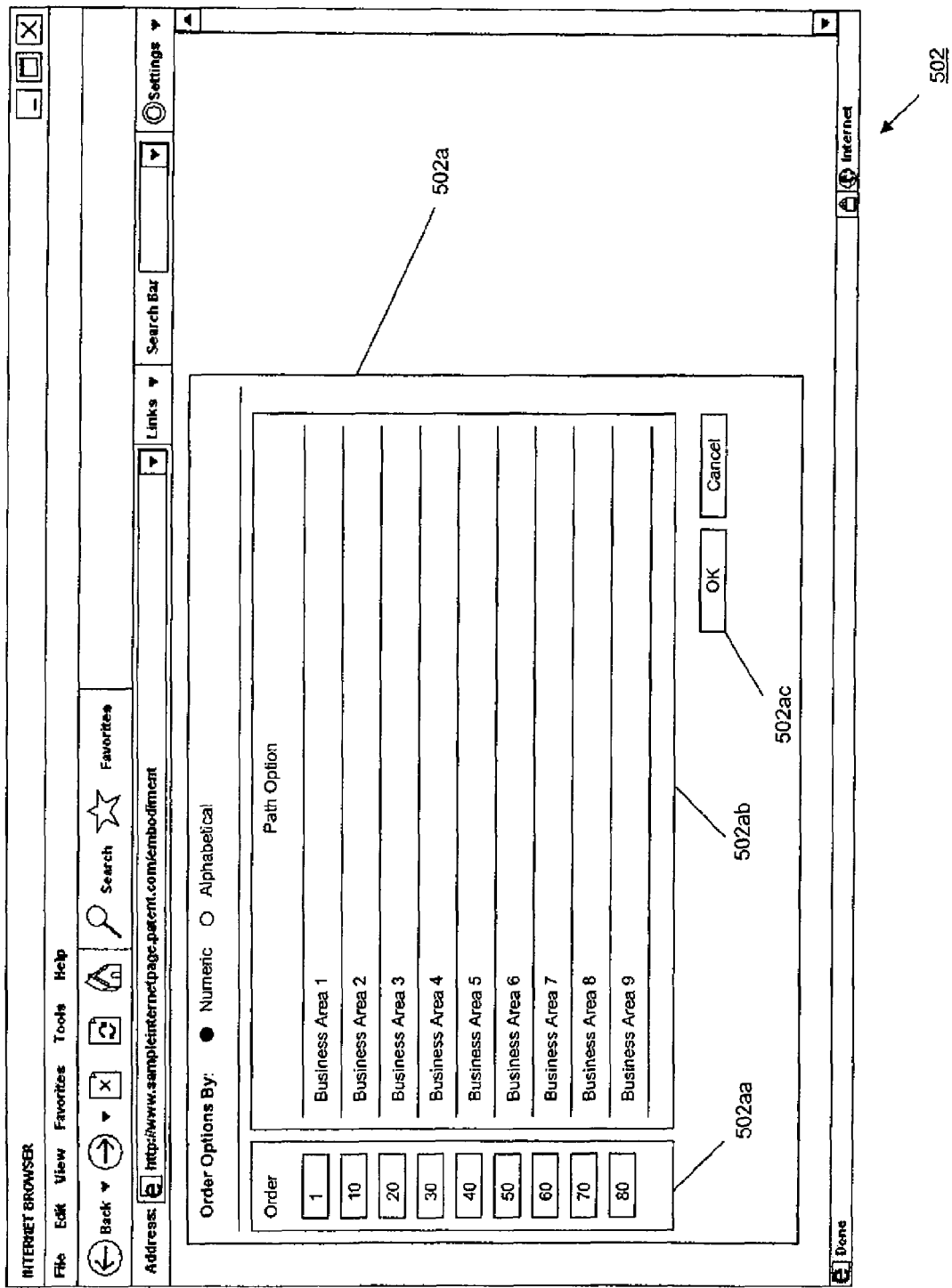
FIG. 5b is a screenshot illustrating an embodiment of a set order webpage used with the administration engine of FIG. 1c.

Referring now to FIGS. 1a, 1b, 1c, 3, 5a and 5b, if the Set Order link 500ac is selected on the edit an existing call path webpage 500, the administration engine 134 provides a set order webpage 502, illustrated in FIG. 5b, having an Order Options box 502a with an Order section 502aa, a Path Option section 502ab, and an OK submit 502ac. Each of the options listed in the Call Path Order box 500ab on the edit an existing call path webpage 500 is provided in the Path Option section 502ab, and an order number corresponding to each option is provided in the order section 502aa (e.g. "1" corresponds to "Business Area 1", "10" corresponds to "Business Area 2", and so on). In the illustrated embodiment, the options in the Path Option section 502ab are ordered by the relative values of their corresponding order numbers in the order section 502aa, lowest to highest. This order is the order in which the options will appear in a drop-down menu that will become available when the call path option associated with the prompt 500aa is provided on the call path options webpages 216a and 216b. This order may be adjusted by adjusting the values of the order number for each option, and new options may be added and given an order number that will place those options at desired positions in the order section 502aa. In an embodiment, the options in the Path Option section 502ab may be ordered alphabetically. When the user of the set order webpage 502 is satisfied with the order of the call path options for a given prompt, the user may select the OK submit 502ac to set that order.

Figure 5C:
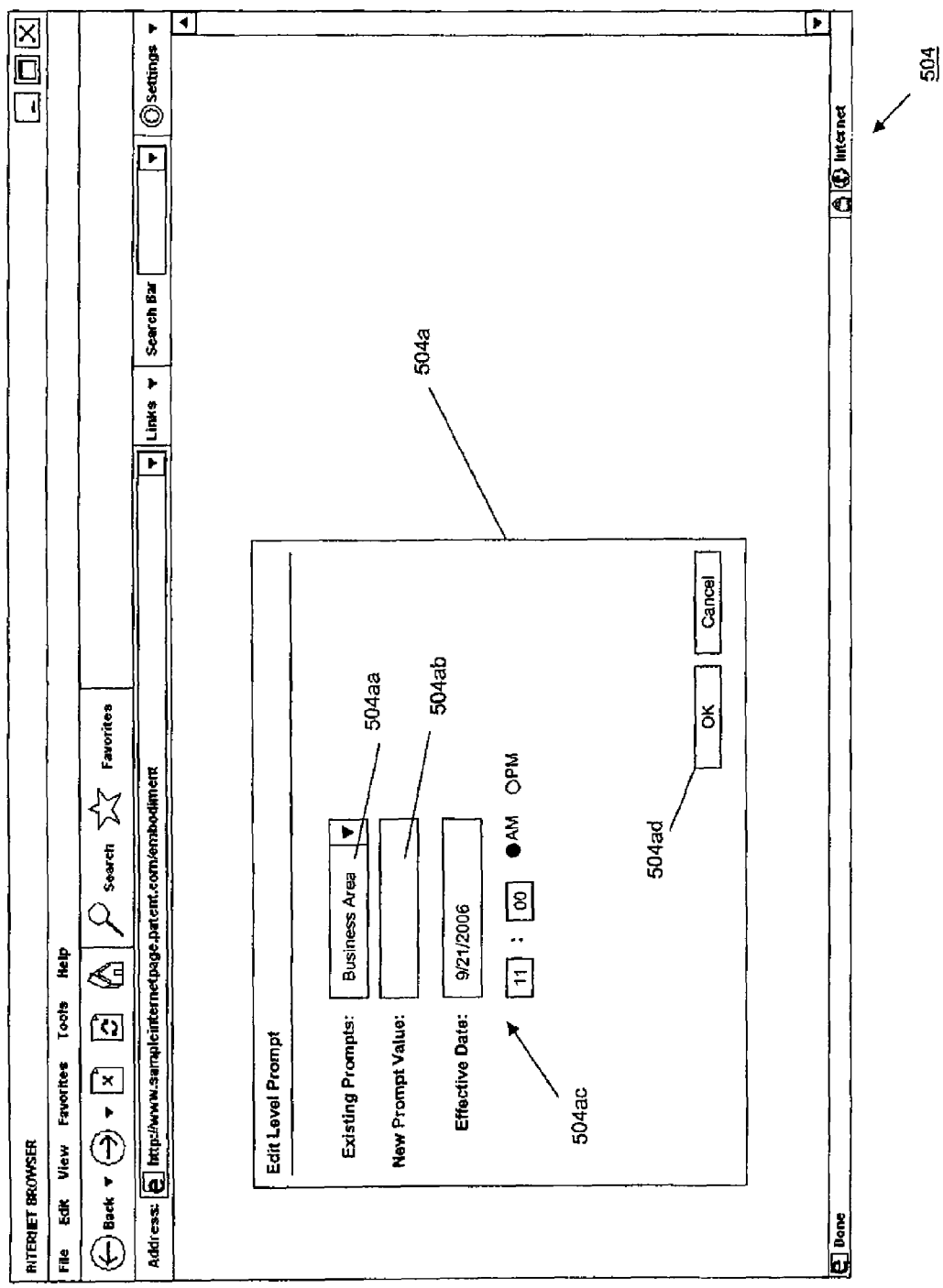
FIG. 5c is a screenshot illustrating an embodiment of an edit prompt webpage used with the administration engine of FIG. 1c.
Figure 5D:
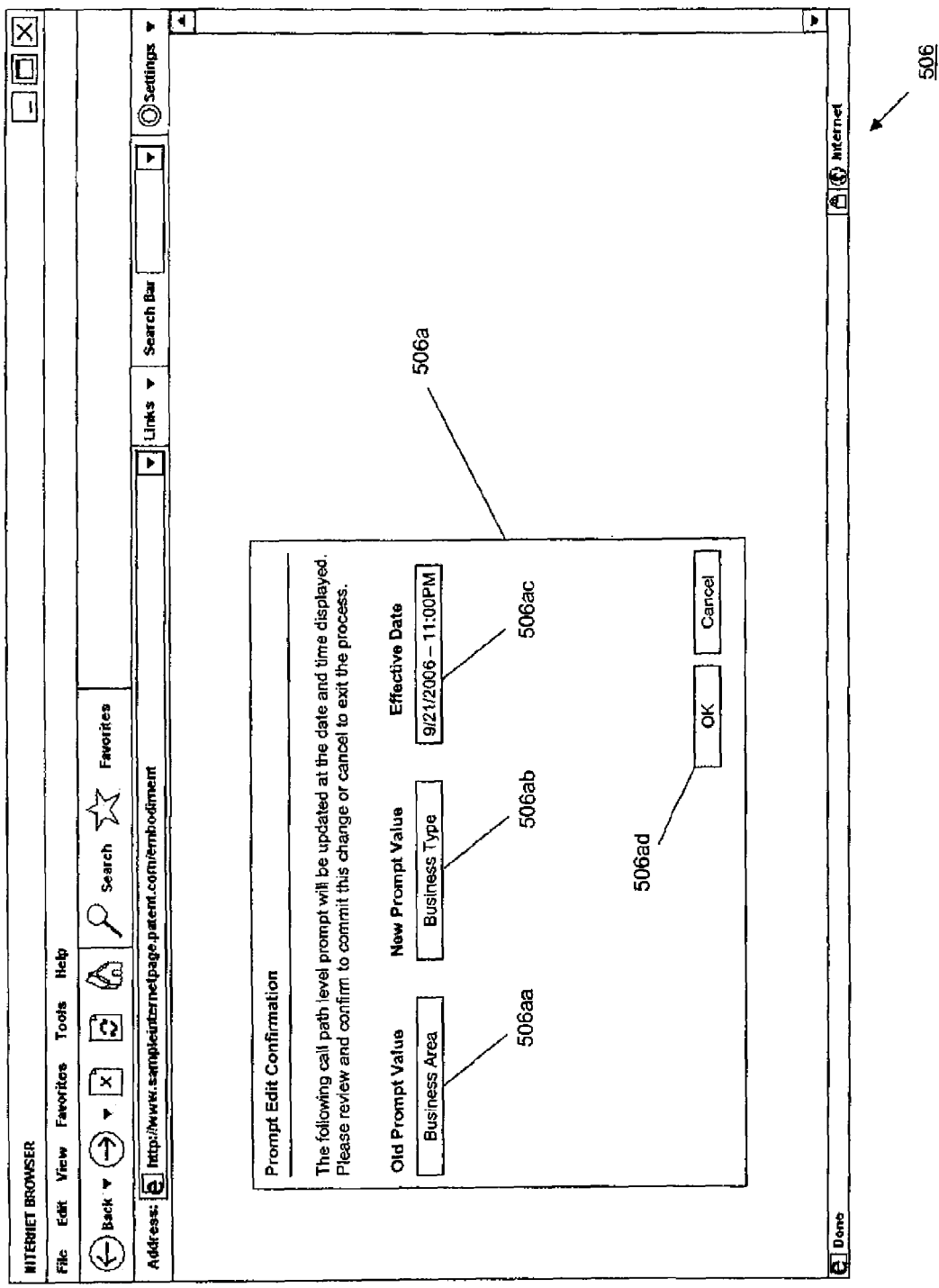
FIG. 5d is a screenshot illustrating an embodiment of a prompt edit confirmation webpage used with the administration engine of FIG. 1c.
Figure 5E:
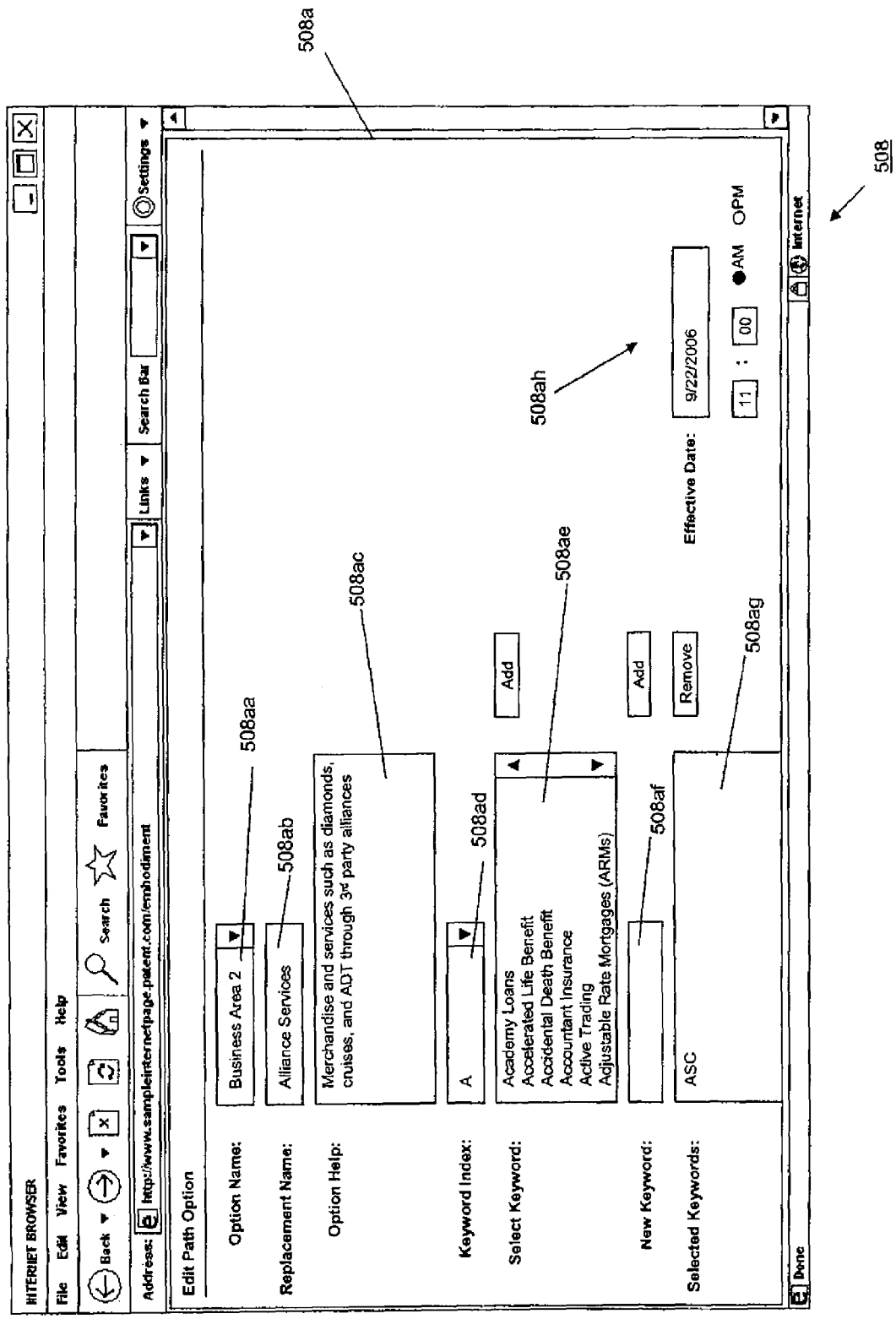
FIG. 5e is a screenshot illustrating an embodiment of an edit path name webpage used with the administration engine of FIG. 1c.
Figure 5F:
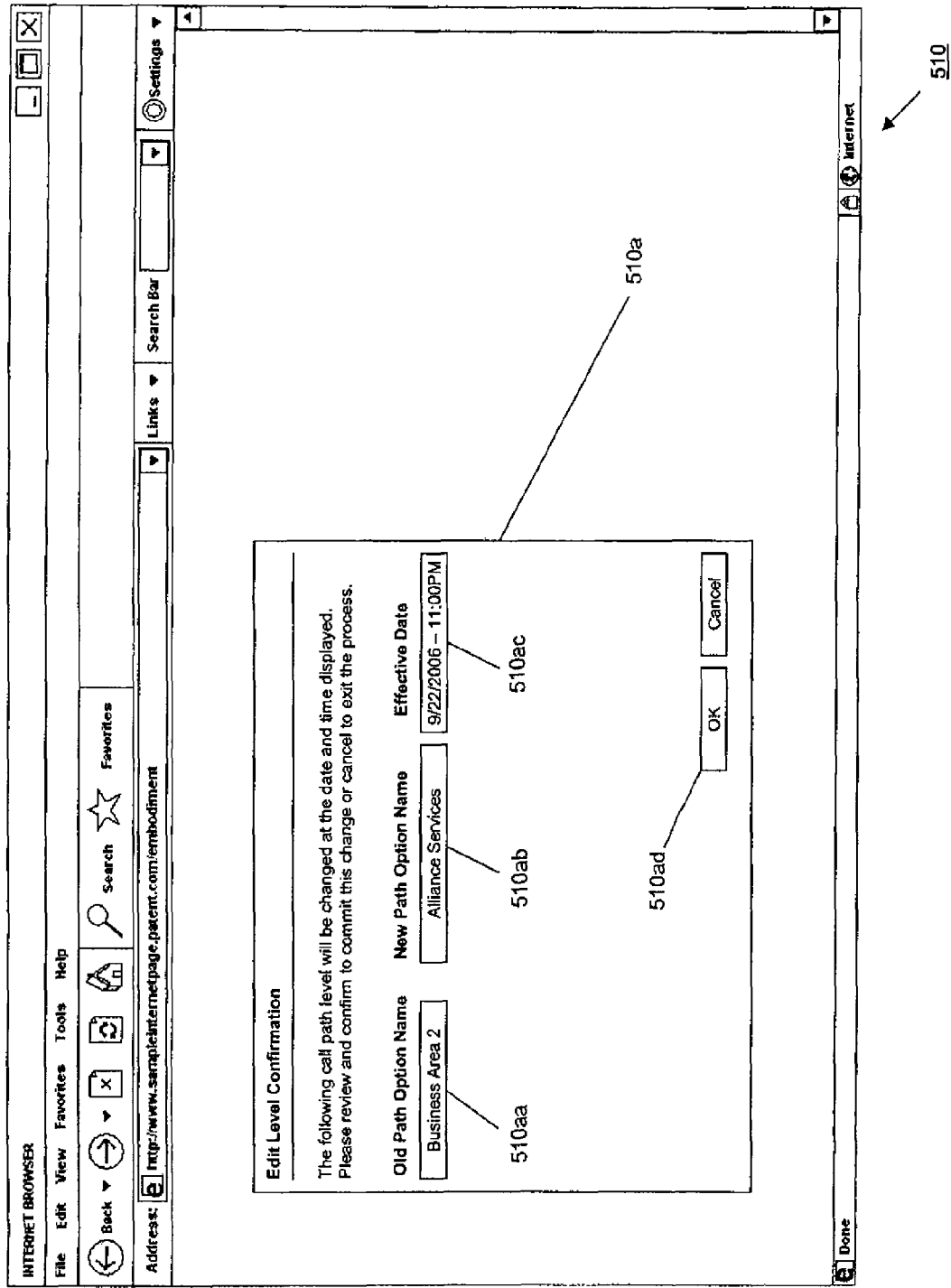
FIG. 5f is a screenshot illustrating an embodiment of an edit path name confirmation webpage used with the administration engine of FIG. 1c.

Referring now to FIGS. 1a, 1b, 1c, 3, 5a, 5c and 5d, if the Edit Prompt link 500ad is selected on the edit an existing call path webpage 500, the administration engine 134 provides an edit prompt webpage 504, illustrated in FIG. 5c, having an Edit Prompt box 504a with an Existing Prompts input field 504aa, a New Prompt input field 504ab, an Effective Date input field 504ac, and an OK submit 504ad. A user of the edit an existing call path webpage 500 may edit a prompt (e.g. "business area", "service type", "product category", "product", "location of asset") by selecting the prompt in the existing prompt input 504aa and providing a new prompt in the new prompt input 504ab. The user of the edit an existing call path webpage 500 may then provide a date and time in the effective date input 504ac for that new prompt to replace the existing prompt. When the user of the edit an existing call path webpage 500 selects the OK submit 504ad to edit the prompt on the effective date, the administration engine 134 provides a prompt edit confirmation webpage 506, illustrated in FIG. 5d, having a Prompt Edit Confirmation box 506a including an Old Prompt Value confirmation 506aa, a New Prompt Value confirmation 506ab, an Effective Date confirmation 506ac, and an OK submit 506ad. The user of the prompt edit confirmation webpage 506 confirms the information in the confirmations 506aa, 506ab and 506ac and selects the OK submit 506ad to tell the administration engine 134 to edit the prompt on the effective date.

Referring now to FIGS. 1a, 1b, 1c, 3, 5a, 5e and 5f, if the Edit Path Name link 500ae is selected on the edit an existing call path webpage 500, the administration engine 134 provides an edit path option webpage 508 having an Edit Path Option box 508a. The Edit Path Option box 508a includes a Option Name input field 508aa, a Replacement name input field 508ab, an Option Help input field 508ac, a Keyword Index input field 508ad, a Select Keyword input field 508ae, a New Keyword input field 508af, a Selected Keyword input field 508ag, and an Effective Date input field 508ah. In the illustrated embodiment, the call path option "Business Area 2" available in the "Business Area" prompt has been selected to be edited and appears in the Option Name input field 508aa. The name "Alliance Services" has been input into the Replacement Name input field 508ab to replace "Business Area 2" as the name of that call path option. Information is entered into the Options Help input field 508ac to provide help information for the call path option that may appear, for example, when a user of the call path options webpages 216a and 216b needs information on the call path options. The Keyword Index input field 508ad may be used to find keywords by their first letter, and the Select Keyword input field 508ae and the New Keyword input field 508af may be then used to add keywords that will be associated with the call path option being edited and then those keywords are listed in the Selected Keywords input field 508ag. The user of the edit path name webpage 508 may input an effective date and time for the call path option edit in the Effective Date input field 508ah. When all the edited information has been entered in the edit path name webpage 508, the administration engine 134 provides an edit path name confirmation webpage 510, illustrated in FIG. 5f, having an Edit Path Name confirmation box 510a with an Old Path Option Name confirmation 510aa, a New Path Option Name confirmation 510ab, an Effective Date confirmation 510ac, and an OK submit 510ad. The user of the edit path name confirmation webpage 510 confirms the information in the confirmations 510aa, 510ab and 510ac and selects the OK submit 510ad to tell the administration engine 134 to edit the path name on the effective date.

Figure 6A:
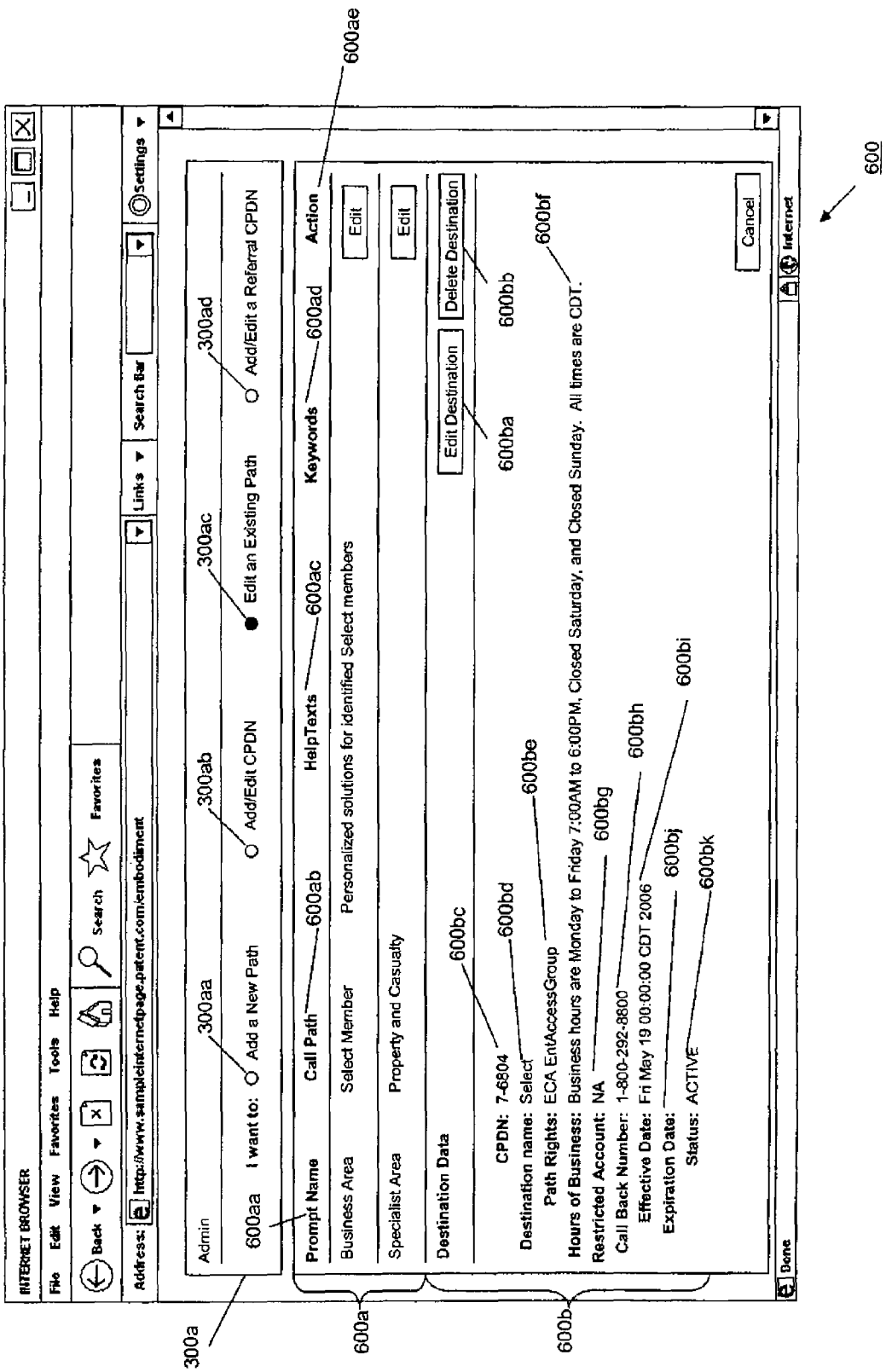
FIG. 6a is a screenshot illustrating an embodiment of a call destination summary webpage used with the administration engine of FIG. 1c.

Referring now to FIGS. 1a, 1b, 1c, 3 and 6a, in an embodiment, if the Edit an Existing Call Path link 300ac is selected on the administration webpage 300, the administration engine 134 provides a call destination summary webpage 600, illustrated in FIG. 6a, having a Destination Call Paths Summary section 600a and a Destination Data section 600b. Each of the entries in the Destination Call Paths Summary section 600a include a prompt name 600aa, a call path 600ab, a helptexts 600ac, keywords 600ad, and an action 600ae. The Destination Data section 600b includes an Edit Destination fink 600ba for editing the destination data displayed and a Delete Destination link 600bb for deleting the destination data displayed. The Destination Data section 600b also includes a CPDN 600bc, a Call Path Destination Name 600bd, a path rights 600be, hours of business 600bf, a restricted account indicator 600bg, a call-back number 600bh, an effective date 600bi, an expiration date 600bj, and a status 600bk. In the illustrated embodiment, the call path destination number 600bc is "7-6804", which may be a portion of a telephone number, and is associated with a call path destination name 600bd of "Select". There are two call paths associated with the call path destination name 600bd of "Select" and the call path destination number 600bc of "7-6804": the first is the call path including "Select Member" in the "Business Area" prompt; and the second is the call path including "Property and Casualty" in the "Specialist Area" prompt. Thus, the selection of "Select Member" in a "Business Area" prompt or the selection of "Property and Casualty" in a "Specialist Area" prompt on the call path options webpages 216a or 216b would provide a user with an option to be connected to the "Select" call path destination associated with the call path destination number "7-6804". While the examples illustrated in FIG. 6a show a pair of single call path options, each associated with a single prompt, as leading to a call path destination corresponding to a call path destination number, in an embodiment, the call path destination number may be associated with a call path resulting from multiple prompts each having a call path option, much like the call path destination resulting from the call path illustrated on the call path options webpage 216b, FIG. 2g. Information included in the Destination Call Paths Summary section 600a includes help text and keywords associated with the listed call paths, and each of the call paths may be edited from the call destination summary webpage 600.

Figure 6B:
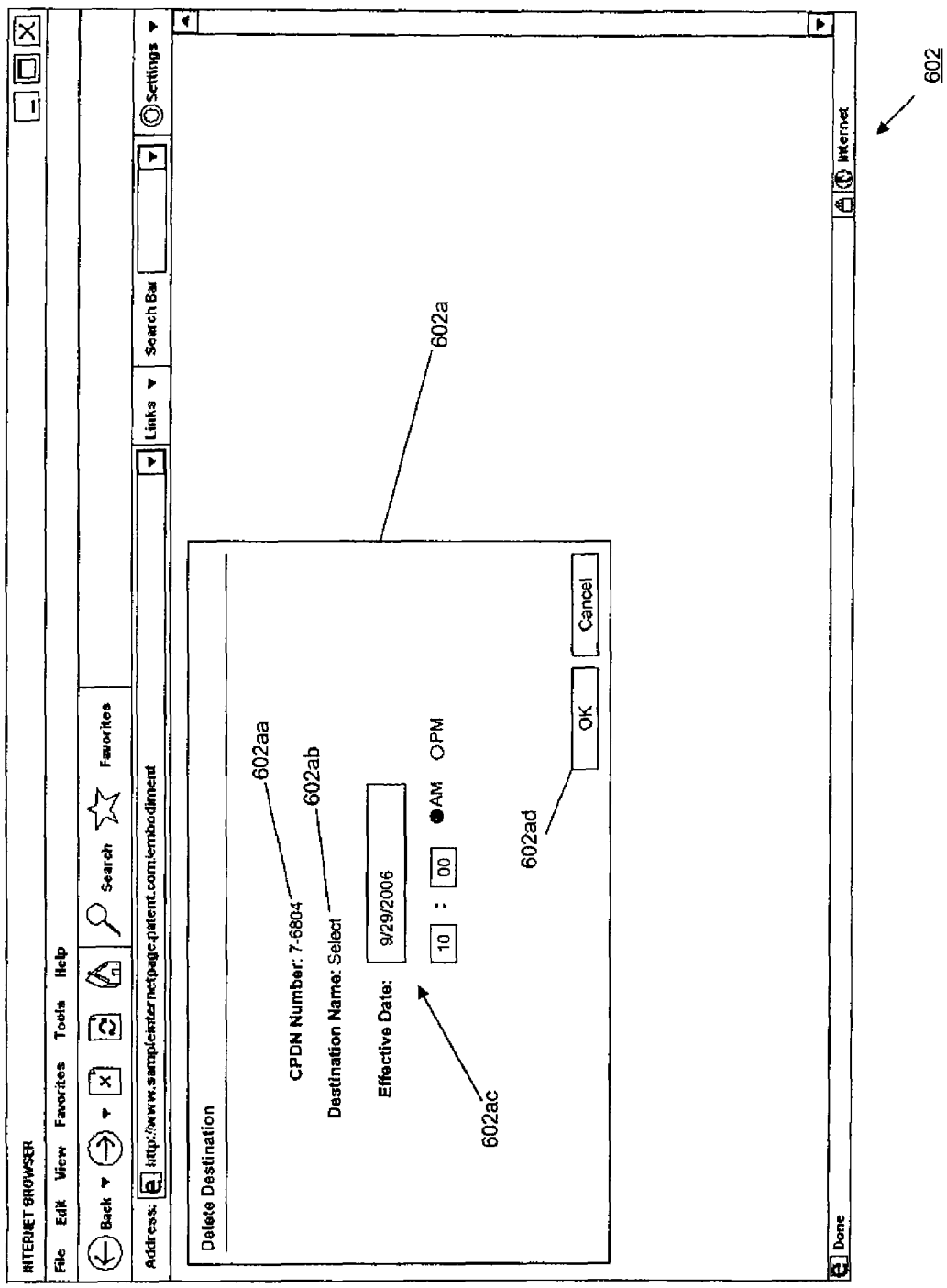
FIG. 6b is a screenshot illustrating an embodiment of a delete destination webpage used with the administration engine of FIG. 1c.
Figure 6C:
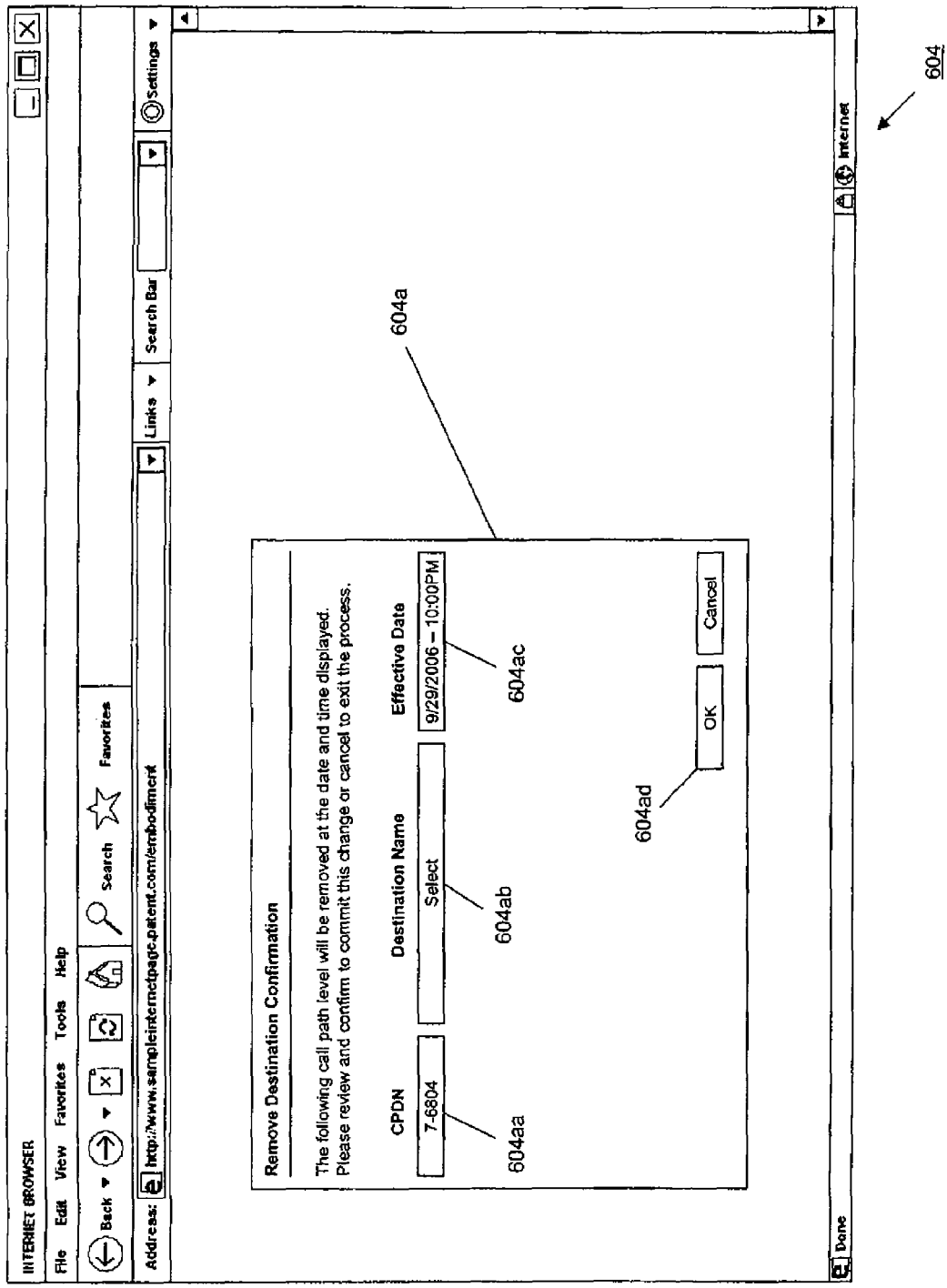
FIG. 6c is a screenshot illustrating an embodiment of a remove destination confirmation webpage used with the administration engine of FIG. 1c.

Referring now to FIGS. 1a, 1b, 1c, 3, 6a, 6b and 6c, if the Delete Destination link 600bb is selected on the call destination summary webpage 600, the administration engine 134 provides a delete destination webpage 602, illustrated in FIG. 6b, having a Delete Destination box 602a including a CPDN confirmation 602aa, a Destination Name confirmation 602ab, an Effective Date input field 602ac, and an OK submit 602ad. The user of the delete destination webpage 602 confirms the information in the CPDN confirmation 602aa and the Destination Name confirmation 602ab, and then inputs a date in the effective date input 602ac. When the user of the delete destination webpage 602 selects the OK submit 602ad, the administration engine 134 provides a remove destination confirmation webpage 604, illustrated in FIG. 6c, having a Remove Destination Confirmation box 604a including a CPDN confirmation 604aa, a Destination Name confirmation 604ab, an Effective confirmation 604ac, and an OK submit 604ad. The user of the remove destination confirmation webpage 604 confirms the information in the confirmations 604aa, 604ab and 604ac and selects the OK submit 604ad to tell the administration engine 134 to delete the call path destination number on the effective date.

Figure 6D:
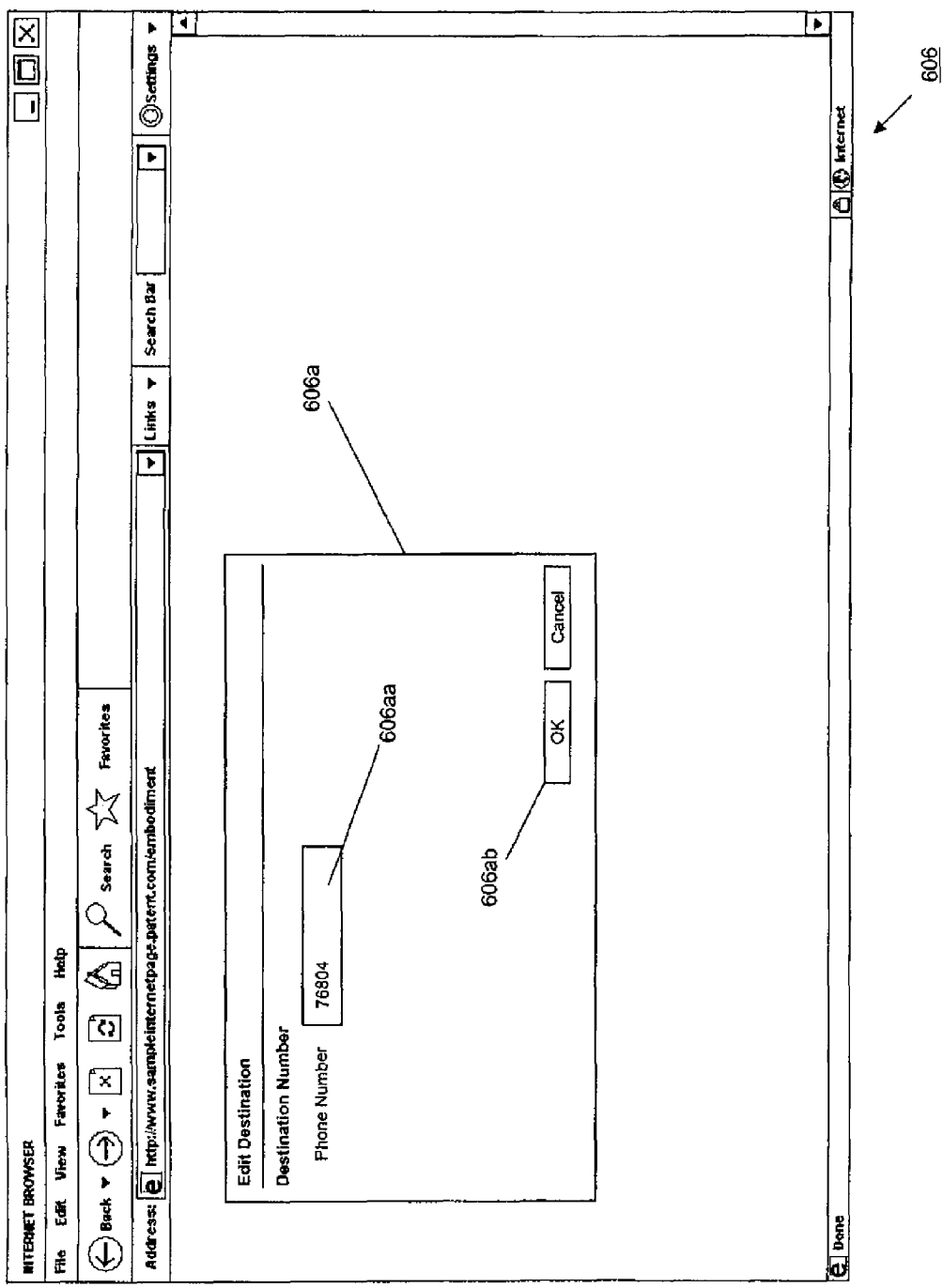
FIG. 6d is a screenshot illustrating an embodiment of an edit destination webpage used with the administration engine of FIG. 1 c.

Referring now to FIGS. 1a, 1b, 1c, 3, 6a and 6d, if the Edit Destination link 600be is selected on the call destination summary webpage 600, the administration engine 134 provides an edit destination webpage 606, illustrated in FIG. 6d, having an Edit Destination box 606a including a Phone Number input 606aa and an OK submit 606ab. The user of the edit destination webpage 606 may input a number into the Phone Number input 606aa and select the OK submit 606ab to change the CPDN that is associated with the call path destination and the call paths listed in the Destination Call Paths Summary section 600a and the Destination Data section 600b on the call destination summary webpage 600. Thus, multiple call paths may be associated with a call path destination and call path destination number, as the call path destination and the call path destination number may be associated with any number of call paths (e.g., the "Select Member" call path 600ab in the "Business Area" prompt name 600aa and the "Property and Casualty" call path 600ab in the "Specialist Area" prompt name 600aa associated with the call path destination number "7-6804", illustrated above in FIG. 6a). The call path destination number may be changed at any time while the call paths and call path destination remain the same.

Figure 7A:
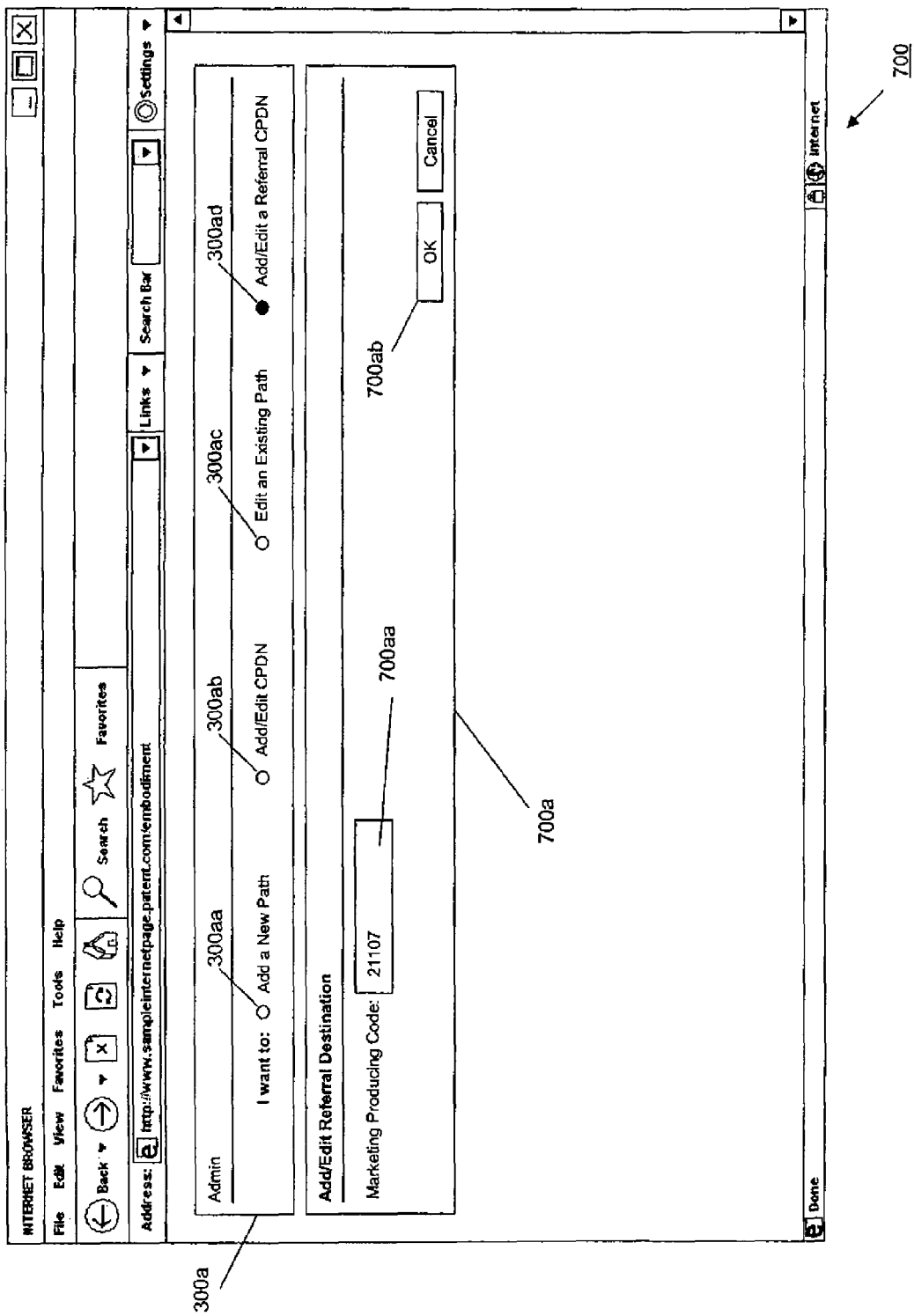
FIG. 7a is a screenshot illustrating an embodiment of an add/edit referral destination webpage used with the administration engine of FIG. 1c.
Figure 7B:
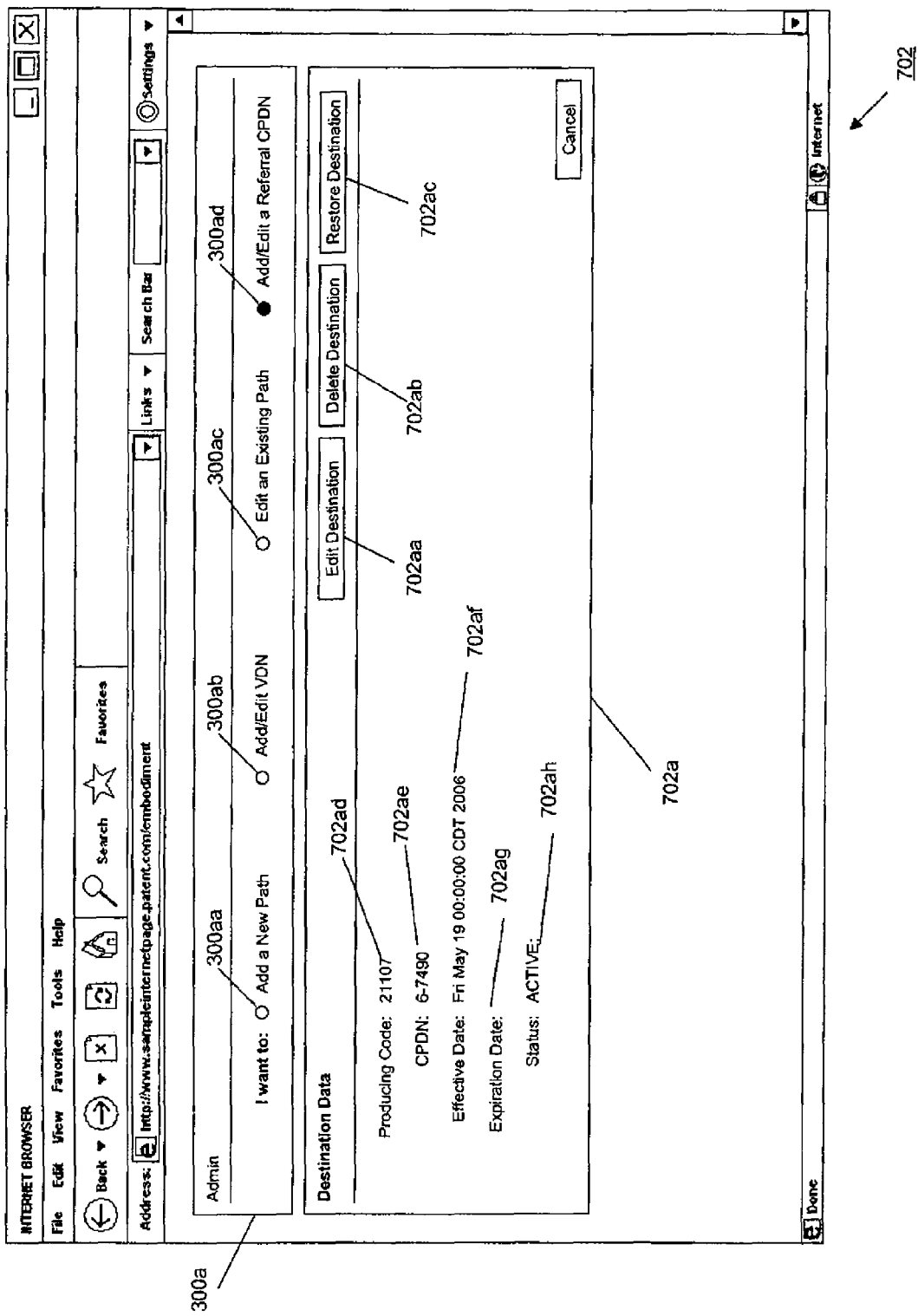
FIG. 7b is a screenshot illustrating an embodiment of a marketing producing code/destination data webpage used with the administration engine of FIG. 1c.

Referring now to FIGS. 1a, 1b, 1c, 3, 7a and 7b, if the Add/Edit a Referral CPDN link 300ad is selected on the administration webpage 300, illustrated in FIG. 3, the administration engine 134 provides an add/edit referral destination webpage 700, illustrated in FIG. 7a, having an Add/Edit Referral Destination box 700a including a Marketing Producing Code input 700aa and an OK submit 700ab. In an embodiment, a marketing producing code is an identifier that may be associated with a particular call path destination number and that references information in the call path database that includes products and/or services that may appeal to a caller to that particular call path destination. When the user of the add/edit referral destination webpage 700 inputs a marketing producing code in the Marketing Producing Code input field 700aa and selects the OK submit 700ab, the administration engine 134 provides a marketing producing code/destination data webpage 702, illustrated in FIG. 7b. The marketing producing code/destination data webpage 702 includes a Destination Data box 702a including an Edit Destination link 702aa, a Delete Destination link 702ab, a Restore Destination link 702ac, a producing code 702ad, a CPDN 702ae, an effective date 702af, an expiration date 702ag, and a status 702ah. The producing code 702ad is the marketing producing code as inputted in the Marketing Producing Code input field 700aa on the add/edit referral destination webpage 700, and the CPDN 702ae is associated with that marketing producing code. In the illustrated embodiment, the marketing producing code includes an effective date 702af, no expiration date 702ag, and an active status 702ah. If the marketing producing code were inactive, the user of the marketing producing code/destination data webpage 702 could reactivate the marketing producing code by selecting the Restore Destination link 702ac. In addition, the user of the marketing producing code/destination data webpage 702 may delete the marketing producing code by selecting the Delete Destination link 702ab.

Figure 7C:
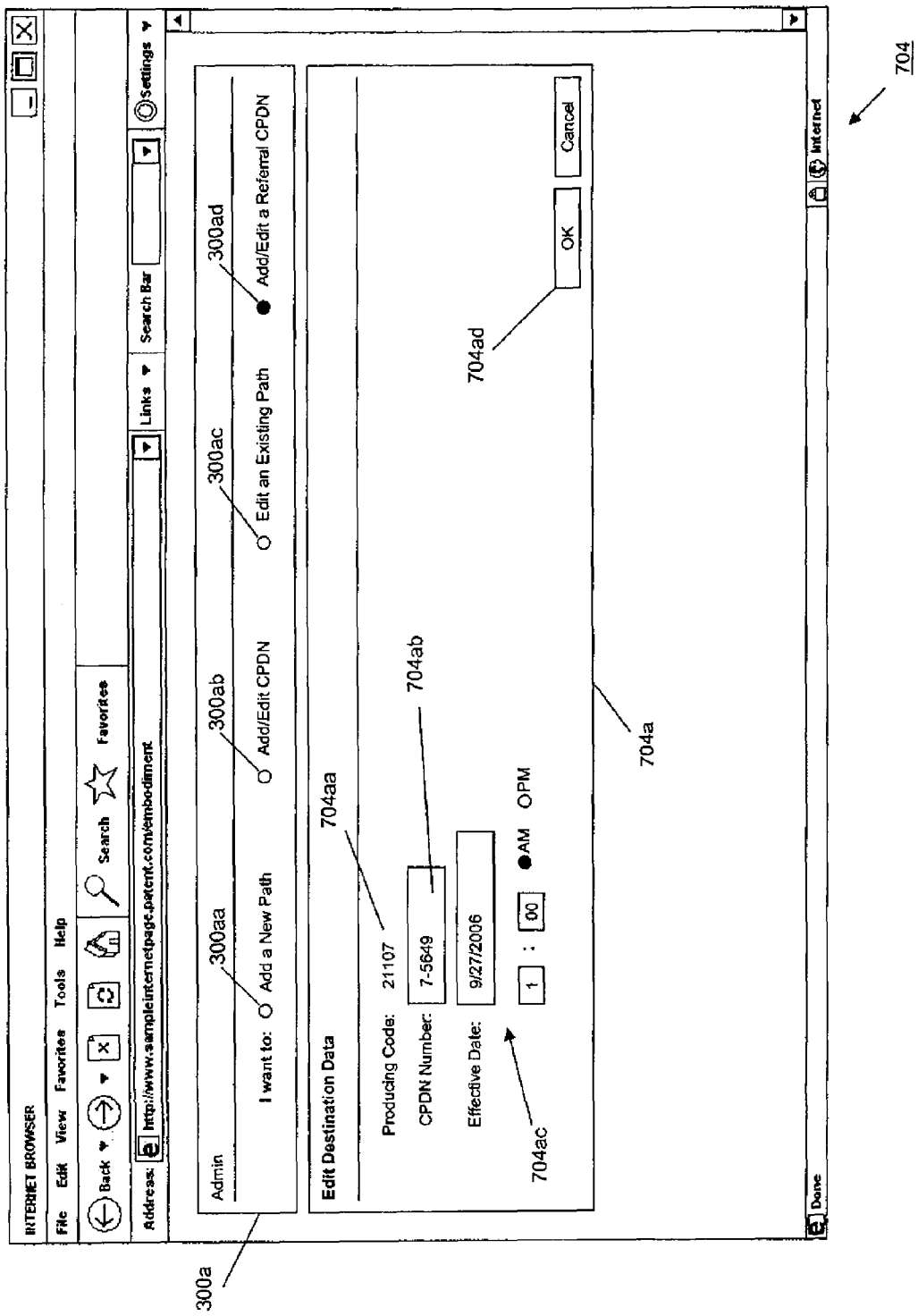
FIG. 7c is a screenshot illustrating an embodiment of an edit destination webpage used with the administration engine of FIG. 1 c.
Figure 7D:
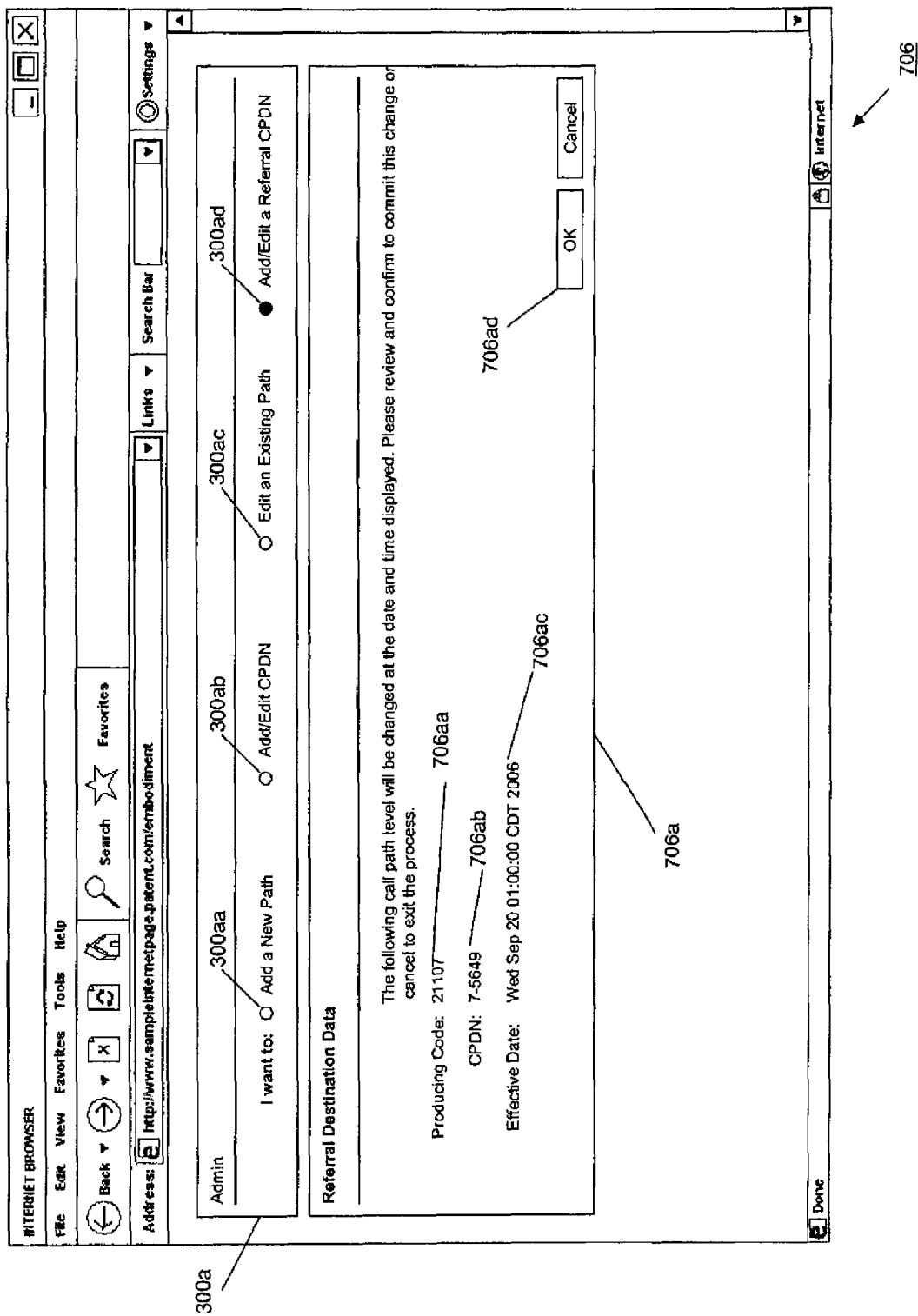
FIG. 7d is a screenshot illustrating an embodiment of a referral confirmation webpage used with the administration engine of FIG. 1c.

Referring now to FIGS. 1a, 1b, 1c, 3, 7b, 7c and 7d, if the Edit Destination link 702aa is selected on the marketing producing code/destination data webpage 702, the administration engine 134 provides an edit destination webpage 704, illustrated in FIG. 7c, having an Edit Destination box 704a including the marketing producing code 704aa, a CPDN input field 704ab, an Effective Date input field 704ac, and an OK submit 704ad. The user of the edit destination webpage 704 may input a call path destination number in the CPDN input field 704ab and input an effective date in the Effective Date input field 704ac. When the user selects the OK submit 704ad, the administration engine 134 provides a referral confirmation webpage 706, illustrated in FIG. 7d, having a Referral confirmation box 706a with a Producing Code confirmation 706aa, a CPDN confirmation 706ab, an Effective Date confirmation 706ac, and an OK submit 706ad. If the user of the referral confirmation webpage 706 agrees with the confirmations 706aa, 706ab, and 706ac, the user selects the OK submit 706ad to tell the administration engine 134 to edit the call path destination number associated with the marketing producing code on the effective date.

Thus, a system and method are provided which allow a call from a caller to be connected to a representative 112 of a provider or to a third party located outside of the provider without the caller or the personal connecting the caller needing knowledge of the phone number of that representative 112 or third party. The call assistance engine 132 allows a user to simply input call path options to build a call path which will correspond to a call path destination and will connect a caller to a representative or third party to whom they are trying to call. The administration engine 134 allows an administrator of the call assistance engine 132 to associate these call path destinations with call path destination numbers (e.g. phone numbers) and add or modify the call path destination numbers as desired. These systems and methods can be very useful for organizations having multiple business areas. Once the call paths and call path destinations are set, when numbers in the different business areas change, the administrator of the call assistance engine 132 simply uses the administration engine 134 to change the call path destination numbers. A user of the call assistance engine 132 does not have to worry about changes to actual telephone numbers, as the call path and call path destination will remain the same (while just being associated with a new call path destination number).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A non-transitory computer-readable storage medium comprising instructions stored thereon that are executed by a processor to:
   connect, by a server, a call from a caller to a first representative;
   receive, by the server, information related to the call from the caller;
   determine, by the server, a call path option based on the received information related to the call;
   determine, by the server, whether a call path destination associated with the call path option is available;
   when the call path option is available, route, by the server, the caller to a second representative, the second representative being qualified to handle the call based on the received information;
   determine, by the server, whether a call path destination associated with the call path option is unavailable; and
   when the call path option is unavailable,
   update, by the server, the call path destination by replacing the call path destination with a new call path destination; and
   provide, by the server, a number and an available call time to the caller responsive to a determination when the new call path destination is available in the future.

2. The medium of claim 1, further comprising instructions executed to provide a telephone number associated with the call path destination to the caller for use when the call path destination is available.

3. The medium of claim 1, further comprising instructions executed to edit a name associated with the call path option.

4. The medium of claim 1, further comprising instructions executable to access a call path database that houses the call path option, wherein the call path option includes a call path destination number.

5. The medium of claim 1, wherein the call path option is associated with at least one of a business area option, a service type option, and a production option.

6. The medium of claim 1, further comprising instructions executable to provide an input field to the representative for entering the received information.

7. The medium of claim 1, further comprising instructions executable to determine whether the representative is qualified to handle the call based on the received information.

8. The medium of claim 1, further comprising instructions executable to determine additional information that is needed to determine the call path option.

9. The medium of claim 1, further comprising instructions executable to present the additional information needed for the determination to the representative.

10. A system, comprising:
- at least one subsystem that connects a call from a caller to a first representative;
- at least one system that receives information related to the call from the caller;
- at least one subsystem that determines a call path option based on the information associated with the call;
- at least one subsystem that determines a time that a call path destination associated with the call path option is available;
- when the call path destination is available, routing by the at least one subsystem, the caller to a second representative being qualified to handle the call based on the information associated with the call;
- at least one subsystem that determines a time that a call path destination associated with the call path option is unavailable; and
- when the call path destination is unavailable,
- update, by the subsystem, the call path destination by replacing the call path destination with a new call path destination; and
- providing, by the subsystem, a time that the new call path destination is available in the future and the telephone number associated with the new call path destination to the caller.

11. The system of claim 10, wherein:
- the information associated with the call includes a classification of the caller; and
- the classification of the caller is compared with a classification of a representative to determine the call path option.

12. The system of claim 11, wherein the information associated with the call includes at least one of a product and a service purchased by the caller.

13. The system of claim 11, wherein the information associated with the call includes a type of employee that the caller is.

* * * * *